United States Patent
Kanamaru et al.

(10) Patent No.: US 6,800,706 B1
(45) Date of Patent: Oct. 5, 2004

(54) PROPYLENE POLYMER, MOLDED OBJECT THEREOF, AND PROCESS FOR PRODUCING PROPYLENE POLYMER

(75) Inventors: Masami Kanamaru, Ichihara (JP); Yutaka Minami, Ichihara (JP); Koji Kakigami, Ichihara (JP); Hideo Funabashi, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 157 days.

(21) Appl. No.: 09/784,444

(22) PCT Filed: Jun. 23, 2000

(86) PCT No.: PCT/JP00/04142

§ 371 (c)(1),
(2), (4) Date: Feb. 26, 2001

(87) PCT Pub. No.: WO01/00693

PCT Pub. Date: Jan. 4, 2001

(30) Foreign Application Priority Data

Jun. 24, 1999 (JP) ............................................ 11-178659
Apr. 20, 2000 (JP) ...................................... 2000-119890

(51) Int. Cl.$^7$ ................................................. C08F 4/52
(52) U.S. Cl. ...................... 526/160; 526/170; 526/943; 526/351; 526/348; 526/901
(58) Field of Search ................................ 526/160, 348, 526/348.2, 348.6, 351, 126

(56) References Cited

U.S. PATENT DOCUMENTS 6,339,135 B1 * 1/2002 Kashiwamura et al. ..... 526/160

FOREIGN PATENT DOCUMENTS

| EP | 0 970 974 | | 1/2000 | |
|----|-----------|---|--------|---|
| EP | 1 006 149 | | 6/2000 | |
| EP | 1 095 951 | | 5/2001 | |
| JP | 06-329726 A | * | 11/1994 | ........... C08F/10/06 |
| JP | 08-231640 A | * | 9/1996 | ........... C08F/10/00 |
| JP | 11-130807 A | * | 5/1999 | ........... C08F/4/642 |

* cited by examiner

Primary Examiner—David W. Wu
Assistant Examiner—Rip A. Lee
(74) Attorney, Agent, or Firm—Oblon, Spivak, McClelland, Maier & Neustadt, P.C.

(57) ABSTRACT

The propylene polymer of the invention is transparent and has good low-temperature heat-sealability and scratch resistance, and is favorable to wrapping and packaging films. (1) The polymer has a melting point, Tm (° C.), measured through differential scanning calorimetry, of $110 \leq Tm \leq 140$; (2) its heat of fusion $\Delta H$ (J/g) and melting point Tm (° C.) satisfy $\Delta H \geq 0.45 \times Tm + 22$; (3) the half-value width Th (° C.) of the peak top of its elution curve obtained in programmed-temperature fractionation is $Th \leq 5$; and (4) its intrinsic viscosity $[\eta]$ (dl/g) measured in a solvent of tetralin at 135° C. falls between 0.5 and 5.

7 Claims, No Drawings

PROPYLENE POLYMER, MOLDED OBJECT THEREOF, AND PROCESS FOR PRODUCING PROPYLENE POLYMER

TECHNICAL FIELD

The present invention relates to a propylene polymer and its moldings, and also to a method for producing propylene polymers. Precisely, the invention relates to a propylene polymer of which the advantages are that its modulus of elasticity is well balanced with its melting point, that its low-temperature moldability and workability is good and that it has well-balanced mechanical strength; and relates to moldings obtained by molding the polymer; and also relates to a method for producing such propylene polymers. As having good low-temperature heat-sealability, good transparency, good scratch resistance and good mechanical strength, the propylene polymer of the invention is suitable to wrapping or packaging films.

BACKGROUND ART

Of polyolefins, polypropylene is inexpensive and has excellent physical properties, and its applications cover various fields including, for example, wrapping or packaging films, etc. For wrapping or packaging films, polypropylene must be modified to have improved low-temperature heat-sealability, as its melting point is relatively high. One general technique heretofore employed to meet the requirement comprises copolymerizing propylene with ethylene or with an α-olefin having from 4 to 20 carbon atoms in the presence of a so-called Ziegler-Natta catalyst that comprises a titanium compound or a titanium compound held on a magnesium compound, and an organoaluminium compound.

However, it is known that the low-temperature heat-sealability of wrapping or packaging films of such a propylene-α-olefin copolymer produced in that manner is not satisfactory though the transparency and the scratch resistance thereof are better than those of films of low-density polyethylene (Japanese Patent No. 268562, Japanese Patent Laid-Open Nos. 241439/1997, 255812/1990). If the α-olefin content of the copolymer is increased so as to further improve the low-temperature heat-sealability of the copolymer, it involves some problems in that the composition distribution of the copolymer is broadened and the molecular weight thereof is lowered, and, as a result, the solvent-soluble content of the copolymer increases and the blocking resistance thereof is thereby lowered. Another problem is that the haze of the copolymer films increases, and the transparency thereof lowers.

On the other hand, it is reported that a metallocene catalyst is effective for producing polyolefins having a narrow molecular weight distribution (J. Polym. Sci., Polym. Chem., Ed. 23, 2117 (1985)). Having tried a metallocene catalyst, however, no one has succeeded in producing propylene polymers having well balanced low-temperature heat-sealability and mechanical strength. This is the current situation in the art.

The present invention is to provide a propylene polymer of which the advantages are that its modulus of elasticity is well balanced with its melting point, that its low-temperature moldability and workability is good and that it has well-balanced mechanical strength; and to provide moldings of the polymer and a method for producing the polymer.

DISCLOSURE OF THE INVENTION

We, the present inventors have assiduously studied so as to attain the above-mentioned object, and, as a result, have found that a propylene polymer of which the melting point and the enthalpy of fusion satisfy a specific relationship and of which the half-value width of the peak top of the elution curve obtained in programmed-temperature fractionation falls within a specific range attains the object. On the basis of this finding, we have completed the present invention. Specifically, the invention provides a propylene polymer and its moldings mentioned below, and provides a method for producing the propylene polymer also mentioned below.

1. A propylene polymer of which the heat of fusion $\Delta H$ (J/g) and the melting point $Tm$ (° C.) measured through differential scanning calorimetry satisfy the following relationship:

$$\Delta H \geq 0.45 \times Tm + 22.$$

2. The propylene polymer of above 1, which has the following properties (1), (2) and (3):

(1) Its melting point $Tm$ (° C.) measured through differential scanning calorimetry is $110 \leq Tm \leq 140$;

(2) The half-value-width $Th$ (° C.) of the peak top of its elution curve obtained in programmed-temperature fractionation is $Th \leq 5$;

(3) Its intrinsic viscosity $[\eta]$ (dl/g) measured in a solvent of tetralin at 135° C. falls between 0.5 and 5.

3. The propylene polymer of above 2, of which the melting point $Tm$ (° C.) measured through differential scanning calorimetry is $120 \leq Tm \leq 140$.

4. The propylene polymer of above 2, of which the melting point $Tm$ (° C.) measured through differential scanning calorimetry is $120 \leq Tm \leq 135$.

5. The propylene polymer of any of above 1 to 4, which is a propylene homopolymer having an isotactic pentad fraction [mmmm] of from 65 to 85 mol %.

6. The propylene polymer of any of above 1 to 4, which is a propylene homopolymer having an isotactic pentad fraction [mmmm] of from 70 to 80 mol %.

7. A molding obtained by molding the propylene polymer of any of above 1 to 6.

8. A method for producing the propylene polymer of any of above 1 to 6, which comprises polymerizing propylene or propylene with ethylene and/or an α-olefin having from 4 to 20 carbon atoms, in the presence of an olefin polymerization catalyst that contains (A) a transition metal compound of the Group 4 of the Periodic Table represented by the following general formula (1), and (B) at least one selected from (B-1) aluminiumoxy compounds and (B-2) ionic compounds capable of reacting with the transition metal compound to give cations:

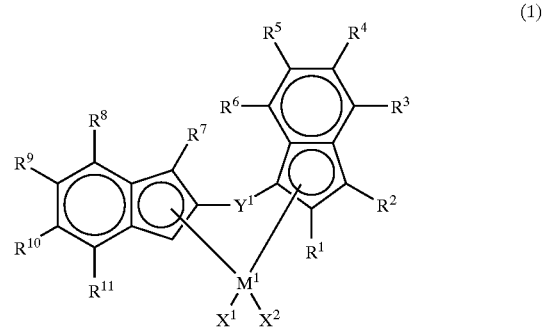

wherein $R^1$ to $R^{11}$, and $X^1$ and $x^2$ each independently represent a hydrogen atom, a halogen atom, a hydrocarbon group having from 1 to 20 carbon atoms, a halogen-containing hydrocarbon group having from 1 to 20 carbon atoms, a silicon-containing group, an oxygen-containing group, a sulfur-containing group, a nitrogen-containing group, or a phosphorus-containing group; $R^3$ and $R^4$, and $R^8$ and $R^9$ may be bonded to each other to form a ring; $y^1$ is a divalent crosslinking group that crosslinks the two ligands, representing any of a hydrocarbon group having from 1 to 20 carbon atoms, a halogen-containing hydrocarbon group having from 1 to 20 carbon atoms, a silicon-containing group, a germanium-containing group, a tin-containing group, —O—, —CO—, —S—, —SO$_2$—, —NR$^{12}$—, —PR$^{12}$—, —P(O)R$^{12}$—, —BR$^{12}$— or —AlR$^{12}$—; $R^{12}$ represents a hydrogen atom, a halogen atom, a hydrocarbon group having from 1 to 20 carbon atoms, or a halogen-containing hydrocarbon group having from 1 to 20 carbon atoms; $M^1$ represents titanium, zirconium or hafnium.

9. A method for producing the propylene polymer of any of above 1 to 6, which comprises polymerizing propylene or propylene with ethylene and/or an α-olefin having from 4 to 20 carbon atoms, in the presence of an olefin polymerization catalyst that contains (A) a transition metal compound of the Group 4 of the Periodic Table represented by the following general formula (2), and (B) at least one selected from (B-1) aluminiumoxy compounds and (B-2) ionic compounds capable of reacting with the transition metal compound to give cations:

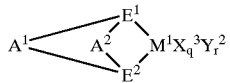

(2)

wherein $M^1$ represents titanium, zirconium or hafnium; $E^1$ and $E^2$ each are a ligand selected from a cyclopentadienyl group, a substituted cyclopentadienyl group, an indenyl group, a substituted indenyl group, a heterocyclopentadienyl group, a substituted heterocyclopentadienyl group, an amido group, a phosphido group, a hydrocarbon group and a silicon-containing group, and they form a crosslinked structure via $A^1$ and $A^2$, and they may be the same or different; $X^3$ represents a σ-bonding ligand, and a plurality of $X^3$'s, if any, may be the same or different, and it may be crosslinked with other $X^3$, $E^1$, $E^2$ or $Y^2$; $Y^2$ represents a Lewis base, and a plurality of $Y^3$'s, if any, may be the same or different, and it may be crosslinked with other $Y^2$, $E^1$, $E^2$ or $X^3$; $A^1$ and $A^2$ each are a divalent crosslinking group that crosslinks the two ligands, representing any of a hydrocarbon group having from 1 to 20 carbon atoms, a halogen-containing hydrocarbon group having from 1 to 20 carbon atoms, a silicon-containing group, a germanium-containing group, a tin-containing group, —O—, —CO—, —S—, —SO$_2$—, —NR$^{12}$—, —PR$^{12}$—, —P(O)R$^{12}$—, —BR$^{12}$— or —AlR$^{12}$—; $R^{12}$ represents a hydrogen atom, a halogen atom, a hydrocarbon group having from 1 to 20 carbon atoms, or a halogen-containing hydrocarbon group having from 1 to 20 carbon atoms; and $A^1$ and $A^2$ may be the same or different; q is an integer of from 1 to 5, indicating [(valence of $M^1$)–2]; and r is an integer of from 0 to 3.

10. The method for producing the propylene polymer of above 8 or 9, wherein propylene or propylene with ethylene and/or an α-olefin having from 4 to 20 carbon atoms is polymerized in a vapor phase.

11. The method for producing the propylene polymer of above 8 or 9, wherein propylene or propylene with ethylene and/or an α-olefin having from 4 to 20 carbon atoms is polymerized in the presence of liquid propylene.

BEST MODES OF CARRYING OUT THE INVENTION

The invention is a propylene polymer and its moldings, and also a method for producing the propylene polymer mentioned above. More precisely, the invention relates to a propylene polymer of which the stereospecificity is on an intermediate level (for example, the stereospecificity of the polymer represented by the isotactic pentad fraction thereof is at most 85 mol %, preferably at most 80 mol %), which is not sticky and has a low melting point, and which is flexible (its tensile modulus falls between 600 and 1,600 MPa, preferably between 700 and 1,200 MPa, more preferably between 800 and 1,100 MPa); and relates to moldings of the polymer and to a method for producing the polymer.

The invention is described in detail hereinunder.

1. Propylene Polymer:

The propylene polymer of the invention is such that its heat of fusion ΔH (J/g) and its melting point Tm (° C.) measured through differential scanning calorimetry satisfy the following relationship:

ΔH≧0.45×Tm+22.

Polymers not satisfying the requirement lose the balance of melting point and modulus of elasticity thereof, and lose the balance of moldability and workability and mechanical strength thereof. Films of such polymers are unfavorable since the balance of low-temperature heat-sealability and mechanical strength thereof is not good.

Preferably, ΔH (J/g) and the melting point Tm (° C.) of the propylene polymer of the invention satisfy the following relationship:

ΔH≧0.45×Tm+25.

More preferably, the propylene polymer of the invention has the following properties (1), (2) and (3):

(1) Its melting point Tm (° C.) measured through differential scanning calorimetry is 110≦Tm≦140;

(2) The half-value width Th (° C.) of the peak top of its elution curve obtained in programmed-temperature fractionation is Th≦5;

(3) Its intrinsic viscosity [ρ] (dl/g) measured in a solvent of tetralin at 135° C. falls between 0.5 and 5.

If not satisfying the above-mentioned requirements, the polymer would hardly attain the object of the invention. For example, the polymer having Tm of lower than 110° C. and therefore not satisfying the requirement (1) is inconvenient to the field of medicines and edibles as its products will fuse when boiled for sterilization. The polymer having Tm of higher than 140° C. could not be a soft material. If not satisfying the requirement (2), the polymer contains an increased amount of sticky components and its films will be not good. The polymer having [ρ] of smaller than 0.5 dl/g and therefore not satisfying the requirement (3) is not so good as its mechanical strength will be low. The polymer having [ρ] of larger than 5.0 dl/g is also not so good as its moldability will be low.

Even more preferably, the propylene polymer of the invention has the following properties (1), (2), (3) and (4):

(1) Its heat of fusion ΔH (J/g) and its melting point Tm (° C.) measured through differential scanning calorimetry satisfy the following relationship:

ΔH≧0.45×Tm+22;

(2) Its melting point Tm (° C.) measured through differential scanning calorimetry is 120≦Tm≦135;

(3) The half-value width Th (° C.) of the peak top of its elution curve obtained in programmed-temperature fractionation is Th≦5;

(4) Its intrinsic viscosity [ρ] (dl/g) measured in a solvent of tetralin at 135° C. falls between 0.5 and 5.

Preferably, Tm (° C.) of the polymer is 120≦Tm≦140, more preferably 120≦Tm≦135. Also preferably, [ρ] of the polymer falls between 0.5 and 4 dl/g, more preferably between 1.0 and 3 dl/g.

The methods for measuring the parameters of the polymer are described in detail in the section of Examples given hereinunder.

In addition to the above-mentioned requirements, the molecular weight distribution (Mw/Mn) of the polymer measured through gel permeation chromatography is preferably at most 4, more preferably at most 3.5, even more preferably at most 3. If its molecular weight distribution (Mw/Mn) is larger than 4, the polymer will be sticky. Also preferably, the boiling diethyl ether extract of the polymer is at most 5% by weight. If its extract is larger than 5% by weight, the polymer will be sticky when formed into films. The method for measuring the boiling diethyl ether extract of the polymer is described in detail in the section of Examples given hereinunder. Also preferably, the peak top temperature Tp of the polymer measured through programmed-temperature fractionation falls between 60 and 95° C. Also preferably, the component of the polymer that is eluted within a temperature range of Tp±5° C. accounts for at least 70% by weight of the polymer.

The propylene polymer of the invention may be a propylene homopolymer and may also be a copolymer of propylene with ethylene and/or an α-olefin having from 4 to 20 carbon atoms (the copolymer is hereinafter referred to as a propylene copolymer). The α-olefin having from 4 to 20 carbon atoms includes 1-butene, 1-pentene, 4-methyl-1-pentene, 1-hexene, 1-octene, 1-decene, 1-dodecene, 1-tetradecene, 1-hexadecene, 1-octadecene, 1-eicosene, etc. In the invention, one more or more of these may be used.

For the propylene homopolymer, its isotactic pentad fraction [mmmm] preferably falls between 65 and 85 mol %, more preferably between 70 and 80 mol %. The isotactic pentad fraction referred to herein is meant to indicate the isotactic fraction of the pentad units in the molecular chain of polypropylene, which is measured on the basis of the signals for the methyl groups in the $^{13}$C nuclear magnetic resonance spectrum of the polymer according to the proposal of A. Zambelli, et al. described in *Macromolecules*, 6, 925, 1973. The $^{13}$C nuclear magnetic resonance spectrometry of the polymer is effected by the use of the following apparatus under the condition mentioned below, based on the peak assignment proposed by A. Zambelli et al. in *Macromolecules*, 8, 687, 1975.

Apparatus: JEOL's JNM-EX400 Model $^{13}$C-NMR

Method: proton complete decoupling

Concentration: 220 mg/ml

Solvent: 90/10 (by volume) mixed solvent of 1,2,4-trichlorobenzene and heavy benzene Temperature: 130° C.

Pulse width: 45°

Pulse frequency: 4 seconds

Frequency integration: 10,000 times

For the propylene copolymer, its comonomer content except propylene is preferably at most 1.0 mol %, in addition to the above-mentioned requirements. Also preferably, the stereospecificity index of the copolymer to be indicated by the isotactic triad fraction [mm] of the propylene moiety of the copolymer falls between 80 and 92 mol %. A larger value of the index means that the copolymer has a higher degree of stereospecificity. The copolymer having a stereospecificity index of smaller than 80 mol % could not be molded well as its elasticity will be too low. The copolymer having a stereospecificity index of larger than 92 mol % will be too hard and could not be flexible. The fraction [mm] can be obtained also through $^{13}$C-NMR, like the above-mentioned fraction [mmmm]. The method for measuring them is described in detail in the section of Examples given hereinunder. Preferably, the propylene copolymer has a random structure.

In ordinary propylene polymerization, the carbon atom on the side of the methylene in one propylene monomer compound first bonds to the active point of the polymerization catalyst used, and the other propylene monomer compounds are then coordinated in order in the same manner as before and are polymerized. This is so-called 1,2-insertion in ordinary propylene polymerization. Rarely, however, 2,1-insertion or 1,3-insertion (abnormal insertion) may occur in propylene polymerization. Preferably, the 2,1-insertion or 1,3-insertion seldom occurs in the polymerization to give the propylene polymer of the invention. Concretely, the abnormal insertion in the propylene polymerization in the invention preferably satisfies the following relational formula (1):

$$[(m\text{-}2,1)+(r\text{-}2,1)+(1,3)] \leq 5.0\ (\%) \quad (1)$$

wherein (m-2,1) means the meso-2,1 insert content (%) measured trough $^{13}$C-NMR; (r-2,1) means the racemi-2,1 insert content (%) measured through $^{13}$C-NMR; and (1,3) means the 1,3-insert content (%) measured through $^{13}$C-NMR.

More preferably, it satisfies the following relational formula (2):

$$[(m\text{-}2,1)+(r\text{-}2,1)+(1,3)] \leq 1.0\ (\%) \quad (2).$$

Most preferably, it satisfies the following relational formula (3):

$$[(m\text{-}2,1)+(r\text{-}2,1)+(1,3)] \leq 0.1\ (\%) \quad (3).$$

If the propylene polymerization does not satisfy the relational formula (1), the crystallinity of the polymer produced will be low beyond expectation, and the polymer will be sticky.

The insert contents (m-2,1), (r-2,1) and (1,3) are obtained in accordance with Grassi et al's report (*Macromolecules*, 21, 617, 1988) and Busico et ales report (*Macromolecules*, 27, 7538, 1994). Concretely, based on their proposals, the assignment of the spectral peaks for the respective inserts is determined, and each insert content is obtained from the integrated intensity of each peak. Specifically, the value (m-2,1) is the meso-2,1 insert content (%) of the polymer analyzed, which is calculated from the ratio of the integrated intensity of the peak assigned to the Pα,γ-thermo that appears at around 17.2 ppm, to the integrated intensity of the peaks appearing in the total methyl carbon region. The value (r-2,1) is the racemi-2,1 insert content (%) of the polymer analyzed, which is calculated from the ratio of the integrated intensity of the peak assigned to the Pα,γ-thermo that appears at around 15.0 ppm, to the integrated intensity of the peaks appearing in the total methyl carbon region. The value (1,3) is the 1,3-insert content (%) of the polymer analyzed, which is calculated from the ratio of the integrated intensity of the peak assigned to the Tβ,G+ that appears at around 31.0 ppm, to the integrated intensity of the peaks appearing in the total methyl carbon region.

In $^{13}$C-NMR spectrometry of the propylene polymer of the invention, it is more desirable that no peak assigned to the molecular chain terminal (n-butyl group) of the polymer derived from the 2,1-insertion appears in the spectral chart. For the molecular chain terminal derived from the 2,1- insertion, the 2,1-insert content of the polymer is calculated in accordance with Jungling et al's report (*J. Polym. Sci.*: Part A: Polym. Chem., 33, 1305, 1995). Concretely, the assignment of the peak for the 2,1-insertion in the $^{13}$C-NMR chart of the polymer is determined, and the insert content is calculated from the integrated intensity of the peak. For isotactic polypropylene, the peak appearing at around 18.9 ppm is assigned to the carbon atom of the terminal methyl group of the n-butyl group. $^{13}$C-NMR to determine the abnormal insertion and the molecular chain terminal of the polymer may be effected by the use of the above-mentioned apparatus under the condition also mentioned above.

2. Method for Producing Propylene Polymer:

For producing the propylene polymer of the invention, propylene or propylene with ethylene and/or an α-olefin having from 4 to 20 carbon atoms is polymerized in the presence of an olefin polymerization catalyst that contains (A) a transition metal compound of the Group 4 of the Periodic Table, and (B) at least one selected from (B-1) aluminiumoxy compounds and (B-2) ionic compounds capable of reacting with the transition metal compound to give cations.

First described are the constituent components of the olefin polymerization catalyst to be used in the invention, and the method for producing the catalyst.

The component (A) is a transition metal compound of the Group 4 of the Periodic Table, which is selected from the following group A.

The group A includes the following (A-1) and (A-2):

(A-1):

This is a transition metal compound of the Group 4 of the Periodic Table represented by the following general formula (1):

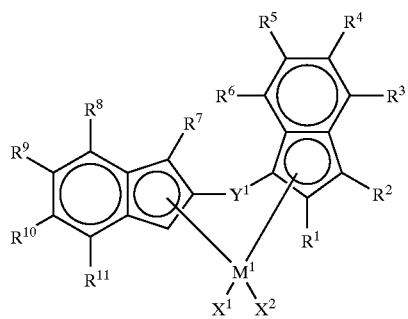

(1)

wherein $R^1$ to $R^{11}$, and $X^1$ and $X^2$ each independently represent a hydrogen atom, a halogen atom, a hydrocarbon group having from 1 to 20 carbon atoms, a halogen-containing hydrocarbon group having from 1 to 20 carbon atoms, a silicon-containing group, an oxygen-containing group, a sulfur-containing group, a nitrogen-containing group, or a phosphorus-containing group; $R^3$ and $R^4$, and $R^8$ and $R^9$ may be bonded to each other to form a ring; $Y^1$ is a divalent crosslinking group that crosslinks the two ligands, representing any of a hydrocarbon group having from 1 to 20 carbon atoms, a halogen-containing hydrocarbon group having from 1 to 20 carbon atoms, a silicon-containing group, a germanium-containing group, a tin-containing group, —O—, —CO—, —S—, —SO$_2$—, —NR$^{12}$—, —PR$^{12}$—, —P(O)R$^{12}$—, —BR$^{12}$— or —AlR$^{12}$—; $R^{12}$ represents a hydrogen atom, a halogen atom, a hydrocarbon group having from 1 to 20 carbon atoms, or a halogen-containing hydrocarbon group having from 1 to 20 carbon atoms; $M^1$ represents titanium, zirconium or hafnium.

The transition metal compound is a single-crosslinked complex.

In formula (1), the halogen atom for $R^1$ to $R^{11}$, and $X^1$ and $X^2$ includes chlorine, bromine, fluorine and iodine atoms. The hydrocarbon group having from 1 go 20 carbon atoms includes an alkyl group such as methyl, ethyl, n-propyl, isopropyl, n-butyl, isobutyl, tert-butyl, n-hexyl and n-decyl groups; an aryl group such as phenyl, 1-naphthyl and 2-naphthyl groups; and an aralkyl group such as benzyl group. The halogen-containing hydrocarbon group having from 1 to 20 carbon atoms includes the above-mentioned hydrocarbon groups of which at least one hydrogen atom is substituted with a halogen atom, such as trifluoromethyl group. The silicon-containing group includes trimethylsilyl and dimethyl(t-butyl)silyl groups; the oxygen-containing group includes methoxy and ethoxy groups; the sulfur-containing group includes thiol and sulfonic acid groups; the nitrogen-containing group includes dimethylamino group; the phosphorus-containing group includes phenylphosphine group. $R^3$ and $R^4$, and $R^8$ and $R^9$ may be bonded to each other to form a ring such as fluorene. For specific examples of $R^3$ and $R^4$, and $R^8$ and $R^9$ bonding to each other, referred to are the groups mentioned above but excepting hydrogen atom. For $R^3$ and $R^9$, preferred are a hydrogen atom and an alkyl group having at most 6 carbon atoms; more preferred are a hydrogen atom, a methyl group, an ethyl group, an isopropyl group, and a cyclohexyl group; and even more preferred is a hydrogen atom. For $R^3$, $R^4$, $R^8$ and $R^9$, preferred is an alkyl group having at most 6 carbon atoms; more preferred are a methyl group, an ethyl group, an isopropyl group and a cyclohexyl group; and even more preferred is an isopropyl group. Preferably, $R^4$, $R^5$, $R^7$, $R^9$ and $R^{10}$ are all hydrogen atoms. More preferably, $R^1$ is an alkyl group and not a hydrogen atom, and $R^7$ is a hydrogen atom. For $X^1$ and $X^2$, preferred are a halogen atom, a methyl group, an ethyl group and a propyl group. Specific examples of $Y^1$ are methylene, ethylene, ethylidene, isopropylidene, cyclohexylidene, 1,2-cyclohexylene, dimethylsilylene, tetramethyldisilylene, dimethylgermylene, methylborylidene (CH$_3$—B═), methylalumilidene (CH$_3$—Al═), phenylphosphylidene (Ph-P═), phenylphosphorylidene (PhPO═), 1,2-phenylene, vinylene (—CH═CH—), vinylidene (CH$_2$═C═), methylimido, oxygen (—O—), sulfur (—S—). Of these, preferred are methylene, ethylene, ethylidene and isopropylidene for more favorably attaining the object of the invention.

$M^1$ indicates titanium, zirconium or hafnium, and is preferably hafnium.

Specific examples of the transition metal compound of formula (1) are 1,2-ethanediyl(1-(2-isobutylindenyl))(2-indenyl)hafnium dichloride, 1,2-ethanediyl(1-(2-butylindenyl))(2-indenyl)hafnium dichloride, 1,2-ethanediyl (1-(2-butylindenyl))(2-(4,7-dimethylindenyl))hafnium dichloride, 1,2-ethanediyl (1-(2-isopropylindenyl))(2-(4,7-dimethylindenyl))hafnium dichloride, 1,2-ethanediyl(1-(2-isopropylindenyl))(2-(4,7-diisopropylindenyl))hafnium dichloride; dimethylsilylene(1-(2-isobutylindenyl))(2-indenyl)hafnium dichloride, dimethylsilylene(1-(2-butylindenyl))(2-indenyl)hafnium dichloride, dimethylsilylene(1-(2-butylindenyl))(2-(4,7-dimethylindenyl))hafnium dichloride, methylsilylene(1-(2-isopropylindenyl))(2-(4,7-dimethylindenyl))hafnium dichloride, methylsilylene(1-(2-isopropylindenyl))(2-(4,7-diisopropylindenyl))hafnium dichloride; 1,3-propanediyl(1-(2-isopropylindenyl))(2-indenyl)hafnium dichloride, 1,3-propanediyl(1-(2-isobutylindenyl))(2-indenyl)hafnium dichloride, 1,3-propanediyl(1-(2-butylindenyl))(2-indenyl) hafnium dichloride, 1,3-propanediyl(1-(2-butylindenyl))(2-(4,7-dimethylindenyl))hafnium dichloride, 1,3-propanediyl (1-(2-isopropylindenyl))(2-(4,7-dimethylindenyl))hafnium dichloride, 1,3-propanediyl(1-(2-isopropylindenyl))(2-(4,7-diisopropylindenyl))hafnium dichloride; 1,2-ethanediyl(1-(4,7-diisopropylindenyl))(2-(4,7-diisopropylindenyl))hafnium dichloride, 1,2-ethanediyl(9-fluorenyl)(2-(4,7-diisopropylindenyl))hafnium dichloride, isopropylidene(1-(4,7-diisopropylindenyl))(2-(4,7-diisopropylindenyl))hafnium dichloride, 1,2-ethanediyl(1-(4,7-dimethylindenyl))(2-(4,7-diisopropylindenyl))hafnium dichloride, 1,2-ethanediyl(9-fluorenyl)(2-(4,7-dimethylindenyl))hafnium dichloride, isopropylidene(1-(4,7-dimethylindenyl))(2-(4,7-diisopropylindenyl))hafnium dichloride, 1,2-ethanediyl(2-indenyl)(1-(2-isopropylindenyl))hafnium dichloride, dimethylsilylene-(2-indenyl)(1-(2-isopropylindenyl))hafnium dichloride; and also their derivatives derived from the compounds by substituting the hafnium therein with zirconium or titanium. However, these are not limitative.

The transition metal compound of formula (1) may be produced, for example, according to the method described in the applicant's own prior patent application, Japanese Patent Laid-Open No. 130807/1999. Forthecomponent (A-1), two or more of the transition metal compounds may be combined.

(A-2):

This is a transition metal compound of Group 4 of the Periodic Table represented by the following general formula (2):

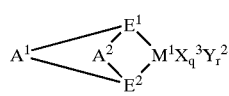
(2)

wherein $M^1$ represents titanium, zirconium or hafnium; $E^1$ and $E^2$ each are a ligand selected from a cyclopentadienyl group, a substituted cyclopentadienyl group, an indenyl group, a substituted indenyl group, a heterocyclopentadienyl group, a substituted heterocyclopentadienyl group, an amido group, a phosphido group, a hydrocarbon group and a silicon-containing group, and they form a crosslinked structure via $A^1$ and $A^2$, and they may be the same or different; $X^3$ represents a ρ-bonding ligand, and a plurality of $X^3$'s, if any, may be the same or different, and it may be crosslinked with other $X^3$, $E^1$, $E^2$ or $Y^2$; $Y^2$ represents a Lewis base, and a plurality of $Y^2$'s, if any, may be the same or different, and it may be crosslinked with other $Y^2$, $E^1$, $E^2$ or $X^3$; $A^1$ and $A^2$ each are a divalent crosslinking group that crosslinks the two ligands, representing any of a hydrocarbon group having from 1 to 20 carbon atoms, a halogen-containing hydrocarbon group having from 1 to 20 carbon atoms, a silicon-containing group, a germanium-containing group, a tin—containing group, —O—, —CO—, —S—, —SO$_2$—, —NR$^{12}$—, —PR$^{12}$—, —P(O)R$^{12}$—, —BR$^{12}$— or —AlR$^{12}$—; $R^{12}$ represents a hydrogen atom, a halogen atom, a hydrocarbon group having from 1 to 20 carbon atoms, or a halogen-containing hydrocarbon group having from 1 to 20 carbon atoms; and $A^1$ and $A^2$ may be the same or different; q is an integer of from 1 to 5, indicating [(valence of $M^1$)–2]; and r is an integer of from 0 to 3.

In the transition metal compound of formula (2) (this is hereinafter referred to as a double-crosslinked complex), $M^1$ represents titanium, zirconium or hafnium, and is preferably zirconium or hafnium. $E^1$ and $E^2$ each are., as so mentioned hereinabove, a ligand selected from a cyclopentadienyl group, a substituted cyclopentadienyl group, an indenyl group, a substituted indenyl group, a heterocyclopentadienyl group, a substituted heterocyclopentadienyl group, an amido group (—N<), a phosphido group (—P<), a hydrocarbon group [>CR—, >C<] and a silicon-containing group [>SiR—, >Si<] (in which R is a hydrogen atom, or a hydrocarbon group having from 1 to 20 carbon atoms, or a hetero atom-containing group), and they form a crosslinked structure via $A^1$ and $A^2$. $E^1$ and $E^2$ may be the same or different. For $E^1$ and $E^2$, preferred are a cyclopentadienyl group, a substituted cyclopentadienyl group, an indenyl group, and a substituted indenyl group.

Specific examples of the a-bonding ligand for $X^3$ are a halogen atom, a hydrocarbon group having from 1 to 20 carbon atoms, an alkoxy group having from 1 to 20 carbon atoms, an aryloxy group having from 6 to 20 carbon atoms, an amido group having from 1 to 20 carbon atoms, a silicon-containing group having from 1 to 20 carbon atoms, a phosphido group having from 1 to 20 carbon atoms, a sulfido group having from 1 to 20 carbon atoms, and an acyl group having from 1 to 20 carbon atoms. A plurality of $X^3$'s, if any in formula (2), may be the same or different, and $X^3$ may be crosslinked with other $X^3$, $E^1$, $E^2$ or $Y^2$.

Specific examples of the Lewis base for $Y^2$ are amines, ethers, phosphines, and thioethers. A plurality of $Y^2$'s, if any in formula (2), may be the same or different, and $Y^2$ may be crosslinked with other $Y^2$, $E^1$, $E^2$ or $X^3$.

Preferably, at least one crosslinking group for $A^1$ and $A^2$ is a hydrocarbon group having at least one carbon atom. For example, the crosslinking group is represented by a general formula:

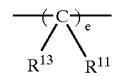

wherein $R^{13}$ and $R^{14}$ each represent a hydrogen atom, or a hydrocarbon group having from 1 to 20 carbon atoms, and they may be the same or different, and may be bonded to each other to form a cyclic structure; and e indicates an integer of from 1 to 4.

Specific examples of the group are a methylene group, an ethylene group, an ethylidene group, a propylidene group, an isopropylidene group, a cyclohexylidene group, a 1,2-cyclohexylene group, and a vinylidene group ($CH_2=C=$). Of these, preferred are a methylene group, an ethylene group and an isopropylidene group. $A^1$ and $A^2$ may be the same or different.

In the transition metal compound of formula (2) where $E^1$ and $E^2$ each are a cyclopentadienyl group, a substituted cyclopentadienyl group, an indenyl group or a substituted indenyl group, the bond of the crosslinking group of $A^1$ and $A^2$ may be in the form of a double-crosslinking modeof (1,1')(2,2') or in the form of a double-crosslinking mode of (1,2')(2,1'). Of the transition metal compounds of formula (2), preferred are those having a double-crosslinked biscyclopentadienyl derivative as the ligand of the following general formula (2-a):

(2-a)

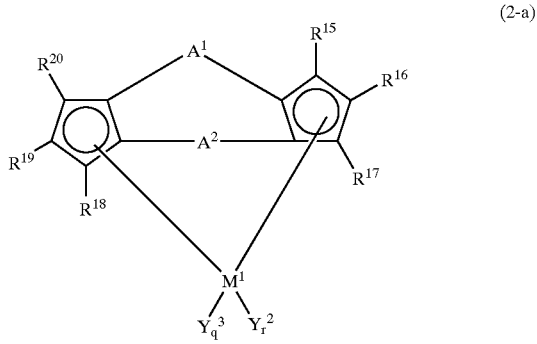

In formula (2-a), $M^1$, $A^1$, $A^2$, q and r have the same meanings as above. $X^3$ represents a σ-bonding ligand, and a plurality of $X^3$'s, if any, may be the same or different, and it may be crosslinked with other $X^3$ or $Y^2$. For specific examples of $X^3$, referred to are the same as those mentioned hereinabove for $X^3$ in formula (2). $Y^2$ represents a Lewis base, and a plurality of $Y^2$'s, if any, may be the same or different, and it may be crosslinked with other $Y^2$ or $X^3$. For specific examples of $Y^2$, referred to are the same as those mentioned hereinabove for $Y^2$ in formula (2). $R^{15}$ to $R^{20}$ each represent a hydrogen atom, a halogen atom, a hydrocarbon group having from 1 to 20 carbon atoms, a halogen-containing hydrocarbon group having from 1 to 20 carbon atoms, a silicon-containing group, or a hetero atom-containing group, and at least one of them must not be a hydrogen atom. $R^{15}$ to $R^{20}$ may be the same or different, and the neighboring groups of them may be bonded to each other to form a ring. Preferably, the neighboring groups form an indenyl group which is substituted with an aromatic ring bonded thereto.

In the transition metal compound having such a double-crosslinked biscyclopentadienyl derivative as the ligand, the ligand may be any of a (1,1')(2,2') double-crosslinked one or a (1,2')(2,1') double-crosslinked one.

Specific examples of the transition metal compound of formula (2) are (1,1'-ethylene)(2,2'-ethylene)-bis(indenyl)zirconium dichloride, (1,2'-ethylene)(2,1'-ethylene)-bis(indenyl)zirconium dichloride, (1,1'-methylene)(2,2'-methylene)-bis(indenyl)zirconiumdichloride, (1,2'-methylene)(2,1'-methylene)-bis(indenyl)zirconium dichloride, (1,1'-isopropylidene)(2,2'-isopropylidene)-bis(indenyl)zirconium dichloride, (1,2'-isopropylidene)(2,1'-isopropylidene)-bis (indenyl)zirconium dichloride, (1,1'-ethylene)(2,2'-ethylene)-bis(3-methylindenyl)zirconium dichloride, (1,2'-ethylene)(2,1'-ethylene)-bis(3-methylindenyl)zirconium dichloride, (1,1'-ethylene)(2,2'-ethylene)-bis(4,5-benzoindenyl)zirconium dichloride, (1,2'-ethylene)(2,1'-ethylene)-bis(4,5-benzoindenyl)zirconium dichloride, (1,1'-ethylene)(2,2'-ethylene)-bis(4-isopropylindenyl)zirconium dichloride, (1,2'-ethylene)(2,1'-ethylene)-bis(4-isopropylindenyl)zirconium dichloride, (1,1'-ethylene)(2,2'-ethylene)-bis(5,6-dimethylindenyl)zirconium dichloride, (1,2'-ethylene(2,1'-ethylene)-bis(5,6-dimethylindenyl)zirconium dichloride, (1,1'-ethylene)(2,2'-ethylene)-bis(4,7-diisopropylindenyl)zirconium dichloride, (1,2'-ethylene)(2,1'-ethylene)-bis(4,7-diisopropylindenyl)zirconium dichloride, (1,1'-ethylene)(2,2'-ethylene)-bis(4-phenylindenyl)zirconium dichloride, (1,2'-ethylene)(2,1'-ethylene)-bis(4-phenylindenyl)zirconium dichloride, (1,1'-ethylene)(2,2'-ethylene)-bis(3-methyl-4-isopropylindenyl)zirconium dichloride, (1,2'-ethylene)(2,1'-ethylene)-bis(3-methyl-4-isopropylindenyl)zirconium dichloride, (1,1'-ethylene)(2,2'-ethylene)-bis(5,6-benzoindenyl)zirconium dichloride, (1,2'-ethylene)(2,1'-ethylene)-bis(5,6-benzoindenyl)zirconium dichloride, (1,1'-ethylene)(2,2'-isopropylidene)-bis(indenyl)zirconium dichloride, (1,2'-ethylene)(2,1'-isopropylidene)-bis(indenyl)zirconium dichloride, (1,1'-isopropylidene)(2,2'-ethylene)-bis(indenyl)zirconium dichloride, (1,2'-methylene)(2,1'-ethylene)-bis(indenyl)zirconium dichloride, (1,1'-methylene)(2,2'-ethylene)-bis(indenyl)zirconium dichloride, (1,1'-ethylene)(2,2'-methylene)-bis(indenyl)zirconium dichloride, (1,1'-methylene)(2,2'-isopropylidene)-bis(indenyl)zirconium dichloride, (1,2'-methylene)(2,1'-isopropylidene)-bis(indenyl)zirconium dichloride, (1,1'-isopropylidene)(2,2'-methylene)-bis(indenyl)zirconium dichloride, (1,1'-methylene)(2,2'-methylene)(3-methylcyclopentadienyl)(cyclopentadienyl)zirconium dichloride, (1,1'-isopropylidene)(2,2'-isopropylidene)(3-methylcyclopentadienyl)(cyclopentadienyl)zirconium dichloride, (1,1'-propylidene)(2,2'-propylidene)(3-methylcyclopentadienyl)(cyclopentadienyl)zirconium dichloride, (1,1'-ethylene)(2,2-methylene)-bis(3-methylcyclopentadienyl)zirconium dichloride, (1,1'methylene)(2,2'-ethylene)-bis(3-methylcyclopentadienyl)zirconium dichloride, (1,1'-isopropylidene)(2,2'-ethylene)-bis(3-methylcyclopentadienyl)zirconium dichloride, (1,1'-ethylene)(2,2'-isopropylidene)-bis(3-methylcyclopentadienyl)zirconium dichloride, (1,1'-methylene)(2,2'-methylene)-bis(3-methylcyclopentadienyl)zirconium dichloride, (1,1'-methylene)(2,2'-isopropylidene)-bis(3-methylcyclopentadienyl)zirconium dichloride, (1, 1'-isopropylidene)(2,2'-isopropylidene)-bis(3-methylcyclopentadienyl)zirconium dichloride, (1,1'-ethylene)(2,2'-methylene)-bis(3,4-dimethylcyclopentadienyl)zirconium dichloride, (1,1'-ethylene)(2,2'-isopropylidene)-bis(3,4-dimethylcyclopentadienyl)zirconium dichloride, (1,1'-methylene)(2,2'-methylene)-bis(3,4-dimethylcyclopentadienyl)zirconium dichloride, (1,1'-methylene)(2,2'-isopropylidene)-bis(3,4-dimethylcyclopentadienyl)zirconium dichloride, (1,1'-isopropylidene)(2,2'-isopropylidene)-bis(3,4-dimethylcyclopentadienyl)zirconium dichloride, (1,2'-ethylene)(2,1'-methylene)-bis(3-methylcyclopentadienyl)zirconium dichloride, (1,2'-ethylene)(2,1'-isopropylidene)-bis(3-methylcyclopentadienyl)zirconium dichloride, (1,2'-methylene)(2,1'-isopropylidene)-bis(3-methylcyclopentadienyl)zirconium dichloride, (1,2'-isopropylidene)(2,1'-isopropylidene)-bis(3-methylcyclopentadienyl)zirconium dichloride, (1,2'-ethylene)(2,1'-methylene)-bis(3,4-dimethylcyclopentadienyl)zirconium dichloride, (1,2'-ethylene)(2,1'-isopropylidene)-bis(3,4-dimethylcyclopentadienyl)zirconium dichloride, (1,2'-methylene)(2,1'-methylene)-bis(3,4-dimethylcyclopentadienyl)zirconium dichloride, (1,2'-methylene)(2,1'-isopropylidene)-bis(3,4-dimethylcyclopentadienyl)zirconium dichloride, (1,2'-isopropylidene)(2,1'-isopropylidene)-bis(3,4-dimethylcyclopentadienyl)zirconium dichloride, (1,2'-ethylene)(2,1'-ethylene)-bis(5,5-phenylindenyl)zirconium dichloride, (1,2'-ethylene)(2,1'-ethylene-bis(5,6-phenylindenyl)zirconium dichloride, (1,2'-ethylene)(2,1'-ethylene)-bis(6,6-phenylindenyl)zirconium dichloride, and their derivatives derived from the compounds by substituting the zirconium therein with titanium or hafnium; as well as dimethylsilylene(1-(2-methyl-4,5-benzoindenyl))(2-indenyl)zirconium dichloride, dimethylsilylene(1-(2-ethyl-4,5-benzoindenyl))(2-indenyl)zirconium dichloride, dimethylsilylene(1-(2-butyl-4,5-benzoindenyl))(2-indenyl)zirconium dichloride, dimethylsilylene(1-(2-methyl-4,5-benzoindenyl))(2-4,7-dimethylindenyl)zirconium dichloride, dimethylsilylene(1-(2-ethyl-4,5-benzoindenyl))(2-4,7-dimethylindenyl)zirconium dichloride, diphenylsilylene(1-(2-methyl-4,5-benzoindenyl))(2-indenyl)zirconium dichloride, diphenylsilylene(1-(2-ethyl-4,5-benzoindenyl))(2-indenyl)zirconium dichloride, diphenylsilylenesilylene(1-(2-butyl-4,5-benzoindenyl))(2-indenyl)zirconium dichloride, diphenylsilylene(1-(2-methyl-4,5-benzoindenyl))(2-4,7-dimethylindenyl)zirconium dichloride, diphenylsilylene(1-(2-ethyl-4,5-benzoindenyl))(2-4,7-dimethylindenyl)zirconium dichloride, and their derivatives with hafnium and not zirconium. Needless-to-say, the invention is not limited to these compounds. For the component (A-2), two or more of these transition metal compounds may be combined.

For the component (A) of the olefin polymerization catalyst to be used in the invention, preferred is the component (A-1).

Next described is the component (B).

The component (B) for use in the invention is at least one selected from (B-1) aluminiumoxy compounds and (B-2) ionic compounds capable of reacting with the transition metal compound to give cations.

The aluminiumoxy compounds for the component (B-1) include linear aluminoxanes of the following general formula (3):

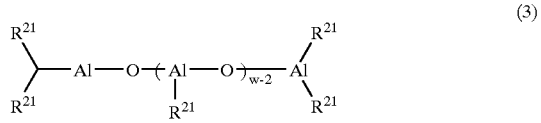

(3)

wherein $R^{21}$ represents a hydrocarbon group, such as an alkyl, alkenyl, aryl, arylalkyl or the like group having from 1 to 20, preferably from 1 to 12 carbon atoms, or a halogen atom; w indicates a degree of mean polymerization, and is an integer generally falling between 2 and 50, preferably between 2 and 40; and plural $R^{21}$'s may be the same or different, and cyclic aluminoxanes of the following general formula (4):

(4)

wherein $R^{21}$ and w have the same meanings as in formula (3).

Concretely, they include methylaluminoxane, ethylaluminoxane and isobutylaluminoxane.

For producing the aluminoxanes, an alkylaluminium may be contacted with a condensation agent such as water or the like, for which the mode of condensation is not specifically defined and the reactants may be reacted in any ordinary manner. For it, for example, employable is (1) a method comprising dissolving an organoaluminium compound in an organic solvent followed by contacting it with water; (2) a method comprising directly adding an organoaluminium compound to the polymerization system that requires the intended aluminoxane, followed by adding water thereto; (3) a method comprising reacting an organoaluminium compound with crystal water existing in metal salts and the like or with water having adsorbed by inorganic or organic substances; or (4) a method comprising reacting a tetraalkyldialuminoxane with a trialkylaluminium and then with water.

The aluminoxanes may be insoluble or soluble in hydrocarbon solvents. Preferably, however, they are soluble in hydrocarbon solvents and the residual organoaluminium compound therein measured through $^1$H-NMR accounts for at most 10% by weight, more preferably from 3 to 5% by weight, even more preferably from 2 to 4% by weight. One advantage of the aluminoxanes of that type is that the proportion of the aluminoxane capable of being held on a carrier (this may be referred to as an on-carrier percentage of the compound) high. Another advantage of the aluminoxanes soluble in hydrocarbon solvents is that their part not held on a carrier can be recycled. Still another advantage is that they do not require any specific treatment before use since their properties are stable. Still another advantage is that the morphology (including the mean particle size and the particle size distribution) of the polyolefins produced through polymerization in the presence of the aluminoxane of that type is good. If the residual organoaluminium compound in aluminoxanes accounts for more than 10% by weight, it is unfavorable since the on-carrier percentage of the aluminoxane will decrease and the polymerization activity thereof will thereby decrease.

For obtaining the aluminoxanes of that type, for example, employable is a method that comprises drying up an aluminoxane solution to completely remove the solvent from it through distillation to dryness under heat under reduced pressure (this is referred to as a drying-up method). In the drying-up method under heat under reduced pressure, it is desirable that the solvent is evaporated away at a temperature not higher than 80° C., more preferably not higher than 60° C.

The fraction not soluble in hydrocarbon solvents may be removed from the aluminoxanes. For removing it, for example, employable is a method that comprises processing the aluminoxane in a hydrocarbon solvent to lead to spontaneous precipitation of the fraction not soluble in the solvent, followed by removing the insoluble fraction through decantation. Another method comprises removing the insoluble fraction through centrifugation or the like. More preferably, the thus-recovered, soluble fraction is filtered through a G5 glass filter or the like in a nitrogen atmosphere, whereby the insoluble fraction is more completely removed from it. The thus-processed aluminoxane will have an increased amount of a gelled fraction with the lapse of time. Therefore, it is desirable that the organoaluminoxane is used within 48 hours after its preparation, more preferably immediately after its preparation. The ratio of the organoaluminoxane to the hydrocarbon solvent is not specifically defined, but it is desirable that the amount of the organoaluminoxane falls between 0.5 and 10 mols in terms of the aluminium atom in the compound relative to 1 liter of the hydrocarbon solvent.

The hydrocarbon solvents include, for example, aromatic hydrocarbons such as benzene, toluene, xylene, cumene, cymene; aliphatic hydrocarbons such as pentane, hexane, heptane, octane, decane, dodecane, hexadecane, octadecane; alicyclic hydrocarbons such as cyclopentane, cyclohexane, cyclooctane, methylcyclopentane; petroleum fractions such as naphtha, kerosene, light gas oil.

One or more of these aluminoxanes may be used herein either singly or as combined.

For the component (B-2), usable are any ionic compounds capable of reacting with the above-mentioned transition metal compound to give cations. Especially preferred are ionic compounds of the following formulae (5) and (6), as they can efficiently form polymerization active points.

wherein $L^2$ indicates $M^2$, $R^{23}R^{24}M^3$, $R^{25}{}_3C$ or $R^{26}M^3$.

In formulae (5) and (6), $L^1$ indicates a Lewis base; $[Z]^-$ indicates a non-coordinating anion $[Z^1]^-$ or $[Z^2]^-$; $[Z^1]^-$ is an anion with a plurality of groups bonded to an element, and it may be represented by $[M^4G^1G^2 \ldots G^f]$ wherein $M^4$ is an element of Groups 5 to 15 of the Periodic Table, preferably an element of Groups 13 to 15 of the Periodic Table; $G^1$ to $G^f$ each indicate a hydrogen atom, a halogen atom, an alkyl group having from 1 to 20 carbon atoms, a dialkylamino group having from 2 to 40 carbon atoms, an alkoxy group having from 1 to 20 carbon atoms, an aryl group having from 6 to 20 carbon atoms, an aryloxy group having from 6 to 20 carbon atoms, an alkylaryl group having from 7 to 40 carbon atoms, an arylalkyl group having from 7 to 40 carbon atoms, a halogen-substituted hydrocarbon group having from 1 to 20 carbon atoms, an acyloxy group having from 1 to 20 carbon atoms, an organometalloid group, or a hetero atom-containing hydrocarbon group having from 2 to 20 carbon atoms; and two or more of $G^1$ to $G^f$ may form a ring; f is an integer, indicating [(valence of the center metal $M^4$)+1]; $[Z^2]^-$ is a conjugated base of a Brønsted acid, of which the logarithmic number (pKa) of the reciprocal of the acid dissociation constant is not larger than −10, alone or a combination of such a Brønsted acid and a Lewis acid, or is a conjugated base which is generally defined as an ultra-strong acid, and it may be coordinated with a Lewis base; $R^{22}$ indicates a hydrogen atom, an alkyl group having from 1 to 20 carbon atoms, an aryl group having from 6 to 20 carbon atoms, an alkylaryl group having from 7 to 40 carbon atoms, or an arylalkyl group having from 7 to 40 carbon atoms; $R^{23}$ and $R^{24}$ each indicate a cyclopentadienyl group, a substituted cyclopentadienyl group, an indenyl group, or a fluorenyl group; $R^{24}$ indicates an alkyl group having from 1 to 20 carbon atoms, an aryl group having from 6 to 20 carbon atoms, an alkylaryl group having from 7 to 40 carbon atoms, or an arylalkyl group having from 7 to 40 carbon atoms; $R^{26}$ indicates a macrocyclic ligand such as tetraphenylporphyrin or phthalocyanine; h is an integer of from 1 to 3, indicating the ion valence of $[L^1-R^{22}]$ or $[L^2]$; a is an integer of at least 1; b=(h×a); $M^2$ includes elements of Groups 1 to 3, 11 to 13 and 17 of the Periodic Table; and $M^3$ indicates an element of Groups 7 to 12 of the Periodic Table.

Specific examples of $L^1$ are ammonia; amines such as methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline, p-nitro-N,N-dimethylaniline; phosphines such as triethylphosphine, triphenylphosphine, diphenylphosphine; thioethers such as tetrahydrothiophene; esters such as ethyl benzoate; and nitriles such as acetonitrile, benzonitrile.

Specific examples of $R^{22}$ are a hydrogen atom, a methyl group, an ethyl group, a benzyl group and a trityl group; specific examples of $R^{23}$ and $R^{24}$ are a cyclopentadienyl group, a methylcyclopentadienyl group, an ethylcyclopentadienyl group, and a pentamethylcyclopentadienyl group. Specific examples of $R^{25}$ are a phenyl group, a p-tolyl group, and a p-methoxyphenyl group. Specific examples of $R^{26}$ are tetraphenylporphyrin, phthalocyanine, allyl and methallyl.

Specific examples of $M^2$ are Li, Na, K, Ag, Cu, Br, I, and $I_3$. Specific examples of $M^3$ are Mn, Fe, Co, Ni, and Zn.

Specific examples of $M^4$ in $[M^4G^1G^2 \ldots G^f]$ for $[Z^1]^-$ are B, Al, Si, P, As and Sb. Preferred are B and Al. Specific examples of $G^1$, $G^2$ to $G^f$ are a dialkylamino group such as dimethylamino and diethylamino groups; an alkoxy or aryloxy group such as methoxy, ethoxy, n-butoxy and phenoxy groups; a hydrocarbon group such as methyl, ethyl, n-propyl, isopropyl, n-butyl, isobutyl, n-octyl, n-eicosyl, phenyl, p-tolyl, benzyl, 4-t-butylphenyl and 3,5-dimethylphenyl groups; a halogen atom such as fluorine, chlorine, bromine and iodine atoms; a hetero atom-containing hydrocarbon group such as p-fluorophenyl, 3,5-difluorophenyl, pentachlorophenyl, 3,4,5-trifluorophenyl, pentafluorophenyl, 3,5-bis(trifluoromethyl)phenyl, and bis(trimethylsilyl)methyl groups; an organometalloid group such as pentamethylantimonyl, trimethylsilyl, trimethylgermyl, diphenylarsenyl, dicyclohexylantimonyl and diphenylboryl groups.

Specific examples of the non-coordinating anion, $[Z^2]^-$, which is a conjugated base of a Brønsted acid having pKa of at most −10 alone or a combination of such a Brønsted acid and a Lewis acid, are trifluoromethanesulfonate anion $(CF_3SO_3)^-$, bis(trifluoromethanesulfonyl)methyl anion, bis(trifluoromethanesulfonyl)benzyl anion, bis(trifluoromethanesulfonyl)amido anion, perchlorate anion $(ClO_4)^-$, trifluoroacetate anion $(CF_3CO_2)^-$, hexafluoroantimonyl anion $(SbF_6)^-$, fluorosulfonate anion $(FSO_3)^-$, chlorosulfonate anion $(ClSO_3)^-$, fluorosulfonate anion/pentafluoroantimony $(FSO_3/SbF_5)^-$, fluorosulfonate anion/pentafluoroarsenic $(FSO_3/AsF_5)^-$, and trifluoromethanesulfonate anion/pentafluoroantimony $(CF_3SO_3/SbF_5)^-$.

Specific examples of the compounds for the component (B-2) are triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, trimethyl(methyl)ammonium tetraphenylborate, trimethylanilinium tetraphenylborate, methylpyridinium tetraphenylborate, benzylpyridinium tetraphenylborate, methyl(2-cyanopyridinium)tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenyl)borate, benzyl(tri-n-butyl) ammonium tetrakis(pentafluorophenyl)borate, methyldiphenylammonium tetrakis(pentafluorophenyl)borate, triphenyl(methyl)ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium)tetrakis(pentafluorophenyl)borate, benzyl(2-cyanopyridinium)tetrakis(pentafluorophenyl)borate, methyl(4-cyanopyridinium)tetrakis(pentafluorophenyl)borate, triphenylphosphonium tetrakis(pentafluorophenyl)borate, dimethylanilinium tetrakis[bis(3,5-ditrifluoromethyl)phenyl]borate, ferrocenium tetraphenylborate, silver tetraphenylborate, trityl tetraphenylborate, tetraphenylporphyrin-manganese tetraphenylborate, ferrocenium tetrakis(pentafluorophenyl)borate, (1,1′-dimethylferrocenium)tetrakis (pentafluorophenyl)borate, decamethylferrocenium tetrakis (pentafluorophenyl)borate, silver tetrakis (pentafluorophenyl)borate, trityl tetrakis(pentafluorophenyl) borate, lithium tetrakis(pentafluorophenyl)borate, sodium tetrakis(pentafluorophenyl)borate, tetraphenylporphyrin-manganese tetrakis(pentafluorophenyl)borate, silver tetrafluoroborate, silver hexafluorophosphate, silver hexafluoroarsenate, silver perchlorate, silver trifluoroacetate, and silver trifluoromethanesulfonate. For the component (B-2), preferred are the ionic compounds of formula (5).

For the component (B-2), one or more of the ionic compounds capable of reacting with the transition metal compound of the component (A) to give cations may be used herein either singly or as combined.

In the olefin polymerization catalyst for use in the invention, the component (B) may be the component (B-1) alone or the component (B-2) alone, or may also be a combination of the components (B-1) and (B-2).

The catalyst may comprise, as the essential ingredients, the components (A) and (B), or may comprise, as the essential ingredients the components (A) and (B) and an additional component (C) of an organoaluminium compound.

The organoaluminium compound for the component (C) may be represented by a general formula (7):

$$R^{27}{}_v AlQ_{3-v} \tag{7}$$

wherein $R^{27}$ indicates an alkyl group having from 1 to 10 carbon atoms; Q indicates a hydrogen atom, an alkoxy group having from 1 to 20 carbon atoms, an aryl group having from 6 to 20 carbon atoms, or a halogen atom; and v is an integer of from 1 to 3.

Specific examples of the compound of formula (7) are trimethylaluminium, triethylaluminium, triisopropylaluminium, triisobutylaluminium, dimethylaluminium chloride, diethylaluminium chloride, methylaluminium dichloride, ethylaluminium dichloride, dimethylaluminium fluoride, diisobutylaluminium hydride, diethylaluminium hydride, and ethylaluminium sesquichloride.

One or more of these organoaluminium compounds may be used herein either singly or as combined.

Regarding the ratio of the catalyst component (A) and the catalyst component (B) that constitute the polymerization catalyst, the molar ratio of the component (A) to the compound (B-1) for the component (B) preferably falls between 1/1 and 1/10⁶, more preferably between 1/10 and 1/10⁴. If the ratio oversteps the defined range, the catalyst cost per the unit weight of the polymer to be produced will be high, and it is impracticable. The molar ratio of the component (A) to the compound (B-2) for the component (B) preferably falls between 10/1 and 1/100, more preferably between 2/1 and 1/10, to the component (A). If the ratio oversteps the defined range, the catalyst cost per the unit weight of the polymer to be produced will be high, and it is impracticable.

The molar ratio of the catalyst component (A) to the optional catalyst component (C) preferably falls between 1/1 and 1/20,000, more preferably between 1/5 and 1/2,000, even more preferably between 1/10 and 1/1,000. The catalyst component (C), if used, enhances the polymerization activity per the transition metal of the catalyst. However, if the component (C) is too much, especially overstepping the defined range, the organoaluminium compound used shall be wasted, and will much remain in the polymer produced; but if too small, it will be often unfavorable since the catalyst activity will be poor.

In the invention, at least one catalyst component may be held on a suitable carrier. The carrier is not specifically defined, and may be any of inorganic oxides, and even other inorganic substances and organic substances. For well controlling the morphology of the polymer to be produced, preferred are inorganic oxide carriers and other inorganic carriers. Concretely, the inorganic oxide carriers include $SiO_2$, $Al_2O_3$, MgO, $ZrO_2$, $TiO_2$, $Fe_2O_3$, $B_2O_3$, CaO, ZnO, BaO, $ThO_2$, and their mixtures, for example, silica-alumina, zeolite, ferrite, and glass fibers. Of those, especially preferred are $SiO_2$ and $Al_2O_3$. The inorganic oxide carriers may contain minor carbonates, nitrates and sulfates. In addition to the carriers mentioned above, also usable herein are other carriers of magnesium compounds of a general formula $MgR^{28}{}_x X^4{}_y$, such as $MgCl_2$ and $Mg(OC_2H_5)_2$, and their complexes. In the formula, $R^{28}$ represents an alkyl group having from 1 to 20 carbon atoms, an alkoxy group having from 1 to 20 carbon atoms, or an aryl group having from 6 to 20 carbon atoms; $X^4$ represents a halogen atom, or an alkyl group having from 1 to 20 carbon atoms; x falls between 0 and 2, y falls between 0 and 2, and x+y=2. Plural $R^{28}$'s and plural $X^4$'s may be the same or different. The organic carriers usable herein include polymers such as polystyrenes, styrene-divinylbenzene copolymers, polyethylenes, polypropylenes, substituted polystyrenes, polyarylates; as well as starch and carbon. Preferred carriers for use in the invention are $MgCl_2$, $MgCl(OC_2H_5)$, $Mg(OC_2H_5)_2$, $SiO_2$ and $Al_2O_3$. The properties of the carriers vary, depending on their type and the method for producing them. The carriers will have a mean pore size generally falling between 1 and 300 μm, but preferably between 10 and 200 μm, more preferably between 20 and 100 μm. If the particle size of the carrier used is too small, the fine powder content of the polymer produced will increase; but if too large, the coarse particles in the polymer will increase, and they lower the bulk density of the polymer and will clog hoppers. The specific surface area of the carrier may fall generally between 1 and 1,000 m²/g, but preferably between 50 and 500 m²/g; and the pore volume thereof may fall generally between 0.1 to 5 cm³/g, but preferably between 0.3 and 3 cm³/g. If any of the specific surface area and the pore volume of the carrier oversteps the defined range, the catalyst activity will be low. The specific surface area and the pore volume of the carrier may be derived from the volume of the nitrogen gas having been absorbed by the carrier, for example, according to the BET method (see *J. Am. Chem. Soc.*, Vol. 60, p. 309 (1983)). Preferably, the carrier is baked at a temperature falling between 150 and 1,000° C., more preferably between 200 and 800° C., before it is used herein.

When at least one catalyst component is held on the carrier, it is desirable that at least one of the catalyst component (A) and the catalyst component (B), more preferably both the components (A) and (B) are held thereon for ensuring good morphology control of the polymer to be produced and for ensuring good applicability of the catalyst to vapor-phase polymerization to give the polymer.

The method for holding at least one of the components (A) and (B) on a carrier such as that mentioned above is not specifically defined. For example, (1) at least one of the components (A) and (B) may be mixed with a carrier; (2) a carrier is first processed with an organoaluminium compound or a halogen-containing silicon compound (e.g., silicon tetrachloride, methyltrichlorosilane, dimethyldichlorosilane, trimethylchlorosilane), and this is then mixed with at least one of the components (A) and (B) in an inert solvent; (3) a carrier is, along with either one or both of the components (A) and (B), reacted with an organoaluminium compound or a halogen-containing silicon compound (e.g., silicon tetrachloride, methyltrichlorosilane, dimethyldichlorosilane, trimethylchlorosilane); (4) the component (A) or (B) is held on a carrier, and this is then mixed with the other component (B) or (A); (5) a product prepared by contacting the components (A) and (B) with each other is mixed with a carrier; or (6) the components (A) and (B) are contacted with each other in the presence of a carrier. In the methods (4), (5) and (6), an organoaluminium compound may be optionally added to the system. The organoaluminium compound may be selected from those for the component (C) mentioned hereinabove.

In the method (4), (5) and (6), the organoaluminium compound for the component (C) may be optionally added to the system.

In the invention, the ratio of the component (B-1) to the carrier preferably falls between 1/0.5 and 1/1,000, more preferably between 1/1 and 1/50 by weight; and the ratio of the component (B-2) to the carrier preferably falls between 1/5 and 1/10,000, more preferably between 1/10 and 1/500 by weight. When the catalyst component (B) is a mixture of two or more compounds, it is desirable that the ratio by weight of each compound to the carrier falls within the defined range. The ratio of the component (A) to the carrier preferably falls between 1/5 and 1/10,000, more preferably between 1/10 and 1/500 by weight.

If the ratio of the component (B) (component (B-1), component (B-2)) to the carrier, or the ratio of the component (A) to the carrier oversteps the defined range, the catalyst activity will be low. The mean particle size of the polymerization catalyst thus prepared herein for use in the invention may fall generally between 2 and 200 $\mu$m, but preferably between 10 and 150 $\mu$m, more preferably between 20 and 100 $\mu$m; and the specific surface area thereof may fall generally between 20 and 1,000 m$^2$/g, but preferably between 50 and 500 m$^2$/g. If the mean particle size of the catalyst is smaller than 2 $\mu$m, fine powder in the polymer produced will increase; but if larger than 200 $\mu$m, coarse particles therein will increase. If the specific surface area of the catalyst is smaller than 20 m$^2$/g, the catalyst activity will be low; but if larger than 1,000 m$^2$/g, the bulk density of the polymer produced will be low. The transition metal content of the polymerization catalyst may fall generally between 0.001 and 1 g, but preferably between 0.001 and 0.1 g per 100 g of the carrier in the catalyst. If the transition metal content oversteps the defined range, the catalyst activity will be low. With the catalyst held on the carrier, olefin polymers having a high bulk density and a desired particle size distribution can be obtained, and they are favorable to industrial use.

The component (A), the component (B) and optionally the component (C) and/or a carrier may be contacted with each other in an inert gas such as nitrogen, in a hydrocarbon solvent such as pentane, hexane, heptane, toluene or cyclohexane. The temperature at which they are contacted with each other may fall between –30° C. and the boiling point of the solvent used, but preferably between –10° C. and 100° C., and the time for their contact may fall generally between 30 seconds and 10 hours. After having been thus contacted with each other, the resulting solid catalyst component may be or may not be washed. In the contact treatment, any of the two different types of transition metal compounds for the component (A) may be used previously to the other, or the two may be mixed before they are contacted with other components.

The catalyst thus prepared may be subjected to solvent removal from it, and the resulting solid may be used for polymerization; or it may be directly used for polymerization as it is.

In the invention, if desired, the treatment of contacting at least one of the component (A) and the component (B) with a carrier so that it is held on the carrier may be effected in a polymerization system. In this case, the intended catalyst is formed in the polymerization system. For example, at least one of the component (A) and the component (B), and a carrier and optionally an organoaluminium compound for the component (C) are added to a polymerization system in which an olefin is pre-polymerized to give the intended catalyst. The olefin for pre-polymerization may be any of ethylene and $\alpha$-olefins having from 3 to 20 carbon atoms, such as propylene, 1-butene-, 1-pentene, 4-methyl-1-pentene, 1-hexene, 1-octene, 1-decene, 1-dodecene and 1-tetradecene. Of those, preferred are ethylene and propylene optionally combined with an $\alpha$-olefin to be used in ethylene-propylene polymerization. The pre-polymerization may be effected in an inert hydrocarbon solvent. Concretely, the solvent may be the same as that used in preparing the solid catalyst component. The amount of the catalyst component to be pre-polymerized may fall generally between $10^{-6}$ and $2 \times 10^{-2}$ mols/liter (solvent), but preferably between $5 \times 10^{-5}$ and $10^{-2}$ mols/liter (solvent) in terms of the transition metal in the component. In one gram of the carrier used, the atomic ratio of aluminium in the organoaluninium compound such as methylaluminoxane (this is referred to as MAO) to the transition metal in thecatalyst component, Al/transition metal, may fall generally between 10 and 5,000, but preferably between 20 and 1,000. The atomic ratio of the aluminium atom in the organoaluminium compound optionally used herein to the aluminium atom in MAO may fall generally between 0.02 and 3, but preferably between 0.05 and 1.5. The temperature for the pre-polymerization may fall between –20 and 60° C., but preferably between 0 and 50° C. The time for the pre-polymerization may fall between 0.5 and 100 hours, but preferably between 1 and 50 hours or so. In the invention, it is desirable that the catalyst is prepared through such olefin pre-polymerization.

Next described is a method of using the polymerization catalyst prepared in the manner as above in propylene homopolymerization or propylene copolymerization with ethylene and/or an $\alpha$-olefin having from 4 to 20 carbon atoms.

The polymerization method is not specifically defined, to which is applicable any mode of slurry polymerization, vapor-phase polymerization, bulk polymerization, solution polymerization or suspension polymerization. However, preferred are slurry polymerization and vapor-phase polymerization; and more preferred is vapor-phase polymerization.

The polymerization condition is described. The polymerization temperature may fall generally between –100 and 250° C., but preferably between –50 and 200° C., more preferably between 0 and 130° C. The ratio of the starting monomer to the catalyst preferably falls between 1 and $10^8$, more preferably between 100 and $10^5$, in terms of the molar ratio of monomer/component (A). The polymerization time may fall generally between 5 minutes and 10 hours; and the reaction pressure preferably falls between normal pressure and 20 MPa·G, more preferably between normal pressure and 10 MPa·G.

For controlling the molecular weight of the polymers to be produced, the type and the amount of the catalyst components to be used and the polymerization temperature will be suitably selected. If desired, hydrogen may be introduced into the polymerization system for that purpose.

The polymerization solvent, if used, includes aromatic hydrocarbons such as benzene, toluene, xylene, ethylbenzene; alicyclic hydrocarbons such as cyclopentane, cyclohexane, methylcyclohexane; aliphatic hydrocarbons such as pentane, hexane, heptane, octane; and halogenohydrocarbons such as chloroform, dichloromethane. One or more such solvents may be used either singly or as combined. As the case may be, the starting monomers such as α-olefins will act also as the solvent. In some polymerization modes, no solvent will be used.

Prior to polymerization, the polymerization catalyst may be subjected to pre-polymerization. For pre-polymerizing it, for example, a small amount of an olefin may be contacted with the solid catalyst component, and the method of pre-polymerization is not specifically defined and may be effected in any known manner. The olefin to be used in the pre-polymerization is not specifically defined, and any one mentioned hereinabove may be used. For example, usable are ethylene, α-olefins having from 3 to 20 carbon atoms, and their mixtures. However, it is desirable that the olefin for the pre-polymerization is the same as that for the final polymerization to give final polymers.

The temperature for the pre-polymerization may fall generally between −20 and 200° C., but preferably between −10 and 130° C., more preferably between 0 and 80° C. A solvent may be used for the pre-polymerization, and it includes inert hydrocarbons, aliphatic hydrocarbons, aromatic hydrocarbons, and monomers. Of those, especially preferred are aliphatic hydrocarbons. As the case may be, the pre-polymerization may be effected in the presence of no solvent.

Preferably, the pre-polymerization condition is so controlled that the pre-polymerization product has an intrinsic viscosity [ρ] (measured in tetralin at 135° C.) of at least 0.2 dl/g, more preferably at least 0.5 dl/g, and that the amount of the pre-polymerization product falls between 1 and 10,000 g, more preferably between 10 and 1,000 g, relative to one mmol of the transition metal component in the catalyst.

In co-polymerization, the order of feeding the starting monomers to the reactor is not specifically defined. Preferably, however, α-olefins are fed thereto prior to propylene thereto. When ethylene is co-polymerized with propylene, it is desirable that a mixed gas of propylene and ethylene is fed to the reactor. The amount of the comonomer to be used is as follows: When an α-olefin is used as the comonomer, its amount falls between 1 and 10,000,000 mols, preferably between 1 and 1,000,000 mols, more preferably between 1 and 100,000 mols per mol of the catalyst. For ethylene, the molar ratio of ethylene/propylene falls between 0.01/100 and 99/100, preferably between 0.01/100 and 55/100, more preferably between 0.01/100 and 10/100.

3. Moldings:

The moldings of the invention are obtained by molding the propylene polymer mentioned hereinabove. The moldings of the invention are characterized in that they are flexible and their low-temperature workability (especially, low-temperature heat-sealability, embossing processability) is good. In addition, they are highly transparent. The moldings of the invention include films, sheets, fibers, containers, automobile trims, housings for electric and electronic appliances for household use, etc. Above all, they are favorable to films and sheets. As having good low-temperature heat-sealability, the films are favorable, for example, for wrapping and packaging edibles and for agricultural use (for example, for hothouses). As highly transparent, the containers are favorable to transparent cases, transparent boxes, decorative boxes, etc.

For forming the moldings, employable is any method of injection molding, compression molding, injection compression molding, gas-assisted injection molding, extrusion, blow molding, calender molding, etc. For forming films and sheets, usable is any of compression molding, extrusion, blow molding or casting.

The invention is described in more detail with reference to the following Examples, which, however, are not intended to restrict the scope of the invention.

First described are the methods for analyzing and evaluating the polymers produced and their resin characteristics and physical properties.

(1) Measurement of [ρ]:

Using a Rigo's automatic viscometer, VMR-053 Model, each sample is measured in a solvent of tetralin at 135° C.

(2) Measurement of Pentad Fraction and Abnormal Insert Fraction:

Measured according to the method described in the section of the detailed description of the invention.

(3) Comonomer Content and Stereospecificity Index [mm] of Copolymer:

Using a JEOL's NMR apparatus, JNM-EX400 Model, each sample is subjected to $^{13}$C-NMR spectrometry under the condition mentioned below, and its data are analyzed according to the methods mentioned below.

Sample concentration: 220 mg/3 ml of NMR solvent

NMR solvent: 1,2,4-trichlorobenzene/benzene-d6 (90/10 vol. %)

Temperature: 130° C.

Pulse width: 45°

Pulse frequency: 4 seconds

Frequency integration: 10,000 times (a) 1-butene Content:

The $^{13}$C-NMR spectral chart of a random copolymer of propylene and 1-butene is analyzed for the chemical shift of each signal and its assignment. The data are in Table 1.

TABLE 1

| No. | Chemical Shift | Assignment |
|---|---|---|
| 1 | 45.7–47.4 | PP Sαα |
| 2 | 43.0–44.9 | PB Sαα |
| 3 | 42.3 | PPP Sαα |
| 4 | 40.3 | BB Sαα |
| 5 | 38.6 | PPP Tαγ |
| 6 | 35.0 | PPP Sαβ, and PPP Tαβ |
| 7 | 35.5 | B unit β |
| 8 | 31.6 | PPP Tβγ |
| 9 | 30.6 | PPP Sαβ |
| 10 | 28.6–29.8 | P unit ββ |
| 11 | 27.8–28.4 | B unit side-chain methylene carbon |
| 12 | 21.2–22.7 | Pββ PPP (mm), PPB (mm), BPB (mm) |
| 13 | 20.6–21.2 | Pββ PPP (mr), PPB (mr), BPB (mr) PPB (rr), BPB (rr) |
| 14 | 19.8–20.6 | Pββ PPP (rr) |
| 15 | 17.6 | Pαβ |
| 16 | 17.2 | Pαγ |
| 17 | 11.1 | B unit-side-chain methyl carbon |

Note)
B indicates 1-butene unit.

The 1-butene unit content, α (mol %), of the copolymer is obtained according to the following formula (1), based on the main-chain methylene carbon.

$$\alpha=\{[(2)/2+(4)]/[(1)+(2)+(3)+(4)+2\times(9)]\}\times 100 \quad (1)$$

The signal intensity of No. 1, 2, . . . in Table 1 is substituted for (1), (2) . . . in formula (1).

The stereospecificity index [mm] of the copolymer is obtained according to the following formula (2), based on the signal intensity of Nos. 12 to 14 in Table 1. This indicates the isotactic triad fraction of the PPP chain in the head-tail bonded site of the copolymer.

$$P=\{(12)/[(12)+(13)+(14)]\}\times 100 \qquad (2)$$

The signal intensity of the PPP chain Sαβ carbon is substituted for the signal of the PPP chain Sαβ carbon.

(4) Measurement of Molecular Weight Distribution (Mw/Mn):

Using the GPC apparatus mentioned below, the weight-average molecular weight Mw and the number-average molecular weight Mn of the polymer are measured in terms of polyethylene, under the condition mentioned below. From the data, obtained is Mw/Mn of the polymer.

GPC apparatus:
Column: TOSO GMHHR-H(S)HT
Detector: RI detector for liquid chromatography, WATERS 150C
Condition:
Solvent: 1,2,4-trichlorobenzene
Temperature: 145° C.
Flow rate: 1.0 ml/min
Sample concentration: 2.2 mg/ml
Amount of sample injected: 160 μl
Calibration curve: Universal Calibration
Program for analysis: HT-GPC (Ver. 10)

(5) DSC:

A differential scanning calorimeter (Parkin Elmer's DSC-7) is used. 10 mg of a sample is melted at 230° C. in a nitrogen atmosphere for 3 minutes, then cooled to 0° C. at a cooling rate of 10° C./min, kept at 0° C. for 3 minutes, and thereafter again heated at a heating rate of 10° C./min. The endothermic heat of fusion of the sample is represented by ΔH. The temperature at which the endothermic fusion curve of the sample gives the peak top is read, and this indicates the melting point, Tm (° C.) of the sample.

(6) Programmed-temperature Fractionation Chromatography:

In the manner mentioned below, the sample is subjected to TREF to obtain its elution curve. In the elution curve, the amount of the eluate fraction (% by weight) of the sample not adsorbed by the filler in the column at 25° C. is read.

(a) Process:

A solution of the sample is introduced into the TREF column conditioned at 135° C., then gradually cooled to 0° C. at a cooling rate of 5° C./hr, and kept as it is for 30 minutes so that the sample is adsorbed by the filler in the column. Next, this is heated up to 135° C. at a heating rate of 40° C./hr. This heat cycle gives an elution curve of the sample. The temperature of the peak top of the elution curve is read, and this is Tp. The amount of the fraction of the sample having been eluted within a temperature range of Tp±5° C. is obtained. The half-value width of the peak top of the elution curve is obtained, and this is Th (° C.).

(b) Apparatus:

TREF column: GL Science's silica gel column (4.6ø×150 mm)
Flow cell: GL Science's KBr cell with an optical path of 1 mm
Feed pump: Senshu Science's SSC-3100 pump
Valve oven: GL Science's Model 554 oven (high-temperature type)
TREF oven: GL Science's TREF oven
Dual thermostat: Rigaku IndustryIs REX-C100 thermostat
Detector: IR detector for liquid chromatography, Foxboro's MIRAN 1A CVF
10-way valve: Balco's electric valve
Loop: Balcols 500-μl loop (c) Condition:
Solvent: o-dichlorobenzene
Sample concentration: 7.5 g/liter
Amount of sample injected: 500 μl
Pump flow rate: 2.0 ml/min
Wavelength for detection: 3.41 μm
Column filler: Chromosorb P (30 to 60 mesh)
Column temperature profile: within ±0.2° C.

(7) Tensile Modulus:

The propylene polymer produced is press-molded into test pieces. The tensile modulus of the test piece is measured in a tensile test according to JIS K7113.

Thickness of test piece (#2 dumbbell): 1 mm
Cross head speed: 50 mm/min
Load cell: 100 kg (8) Internal Haze:

The propylene polymer produced is press-molded into test pieces. The test piece is tested for its internal haze according to JIS K7105.

Test piece: 15 cm×15 cm×1 mm (thickness: 1 mm)

(9) Measurement of Boiling Diethyl Ether Extract:

Using a Soxhlet extractor, the sample is extracted under the condition mentioned below.

Sample: 1 to 2 g
Sample morphology: powder (pellets are powdered)
Extraction solvent: diethyl ether
Extraction time: 10 hours
Extraction frequency: at least 180 times The boiling diethyl ether extract of the sample is obtained according to the following formula:

[diethyl ether extract (g)/amount of powdery sample (g)]×100

PRODUCTION EXAMPLE 1

(1) Production of (1,2'-ethylene)(2,1'ethylene)-bis (5-phenylindenyl)hafnium dichloride Production of 3,4-dimethylbiphenyl 3,4-Dimethylaniline (50 g, 0.41 mols) and benzene (1000 ml) were mixed in a 2-liter round-bottom flask equipped with a magnetic stirrer, a Dimroth condenser and a dropping funnel, and heated up to 80° C. in a nitrogen atmosphere. With heating it under reflux, isoamyl nitrite (84 ml, 0.63 mols) was gradually and dropwise added thereto to give nitrogen gas. This was further heated under reflux for 48 hours, and then benzene was evaporated away. The residue was purified through a column (with a solvent of hexane to give first the product). The yield of the product was 54% (40.3 g, 0.22 mols).

Production of 4-phenyl-o-xylylene dibromide 3,4-Dimethylbiphenyl (44.7 g, 0.245 mols), N-bromosuccinimide (98.1 g, 0.539 mols), carbon tetrachloride (560 ml) and azobisisobutyronitrile (0.15 g) were mixed in a one-liter round-bottom flask equipped with a magnetic stirrer and a Dimroth condenser, and heated and stirred at 80° C. for 1 hour in a nitrogen atmosphere. After having been thus reacted, the resulting suspension was filtered, and the solvent was evaporated away. The yield of the product was 99% (83 g, 0.0244 mols).

Production of 4-phenyl-p-xylylenedinitrile

Methanol (240 ml), water (80 ml), 4-phenyl-o-xylylene dibromide (83 g, 0.0244 mols) andpotassiumcyanide (41 g, 0.625 mols) were mixed in a 500-ml round-bottom flask equipped with a magnetic stirrer and a Dimroth condenser, and heated and stirred at 70° C. for 1 hour. After having been thus reacted, water (350 ml) was added to the reaction mixture. Then, the reaction product was extracted three times with diethyl ether (100 ml). The crude product was purified through a column (developer solvent: methylene chloride). The yield of the intended compound was 41% (23 g, 0.099 mols).

Production of 4-phenyl-1,2-diacetic acid-benzene

4-Phenyl-o-xylylenedinitrile (33 g, 0.142 mols), acetic acid (130 ml), concentrated sulfuric acid (130 ml) and water (130 ml) were put into a 2-liter eggplant-type flask equipped with a Dimroth condenser and a magnetic stirrer, and heated under reflux for 45 minutes. After having been thus reacted, water (800 ml) was added to the reaction mixture. The resulting precipitate was taken out through filtration, and dried under reduced pressure at 60° C. The yield of the thus-obtained compound was 70% (27 g, 0.100 mols).

Production of 4-phenyl-1,2-bis(methyl acptate)benzene

4-Phenyl-1,2-diacetic acid-benzene (27 g, 0.100 mols), dewatered ethanol (400 ml) and concentrated sulfuric acid (16 g) were put into a one-liter eggplant-type flask equipped with a Dimroth condenser and a magnetic stirrer, and heated under reflux for 8 hours. After having been thus reacted, water (500 ml) was added to the reaction mixture. Then, this was extracted with diethyl ether (400 ml) to obtain a crude product. The crude product was extracted with toluene (300 ml). The yield of the thus-obtained compound was 86% (28 g, 0.086 mols).

Production of 6-phenyl-1-ethoxycarbonyl-2-indanone

Sodium (1.95 g, 0.085 mols) and toluene (400 ml) were put into a one-liter separable flask equipped with a mechanical stirrer, a Dimroth condenser and a dropping funnel, and heated up to 110° C. with stirring. A toluene solution (400 ml) of 4-phenyl-1,2-bis(ethyl acetate)benzene (28 g, 0.086 mols) was gradually and dropwise added to this over a period of 2 hours. After the addition, this was heated under reflux for 3 hours. After thus reacted, this was left cooled, and ethanol (50 ml) and then aqueous 10% acetic acid solution (500 ml) cooled with ice were added thereto in that order. The organic phase was separated from it, and dried with magnesium sulfate, and then the solvent was evaporated away. The yield of the intended compound was 71% (20 g, 0.071 mols).

Production of 5-phenyl-2-indanone

6-Phenyl-1-ethoxycarbonyl-2-indanone (20 g, 0.071 mols), dimethylsulfoxide (200 ml), water (5 g) and sodium chloride (5 g) were put into a one-liter eggplant-type flask equipped with a magnetic stirrer, and heated at 120° C. for 25 minutes. After having been thus reacted, this was left cooled, to which was added water (500 ml). Then, this was extracted with diethyl ether (500 ml). The organic phase was separated from it, and dried with magnesium sulfate, and then the solvent was evaporated away. The yield of the intended compound was 94% (14 g, 0.067 mols).

Production of ethyl 1-(5-phenyl-2-indenyl)acetate

Sodium hydride (1.7 g, 0.071 mols) and THF (tetrahydrofuran, 100 ml) were put into a 300-ml three-neck flask equipped with two dropping funnels, in a nitrogen atmosphere. Ethyl diethylphosphonoacetate (15.0 g, 0.067 mols) and THF (50 ml) were put into one dropping funnel; and 5-phenyl-2-indanone (14 g, 0.067 mols) and THF (50 ml) were into the other dropping funnel. With cooling with ice, the THF solution of ethyl diethylphosphonoacetate was dropwise added thereto, and stirred at room temperature for 30 minutes. Next, also with cooling with ice, the THF solution of 5-phenyl-2-indanone was dropwise added thereto, and stirred at room temperature for 1 hour. After having been thus reacted, water (100 ml) was added to the reaction mixture, and the product was extracted with diethyl ether (500 ml). The yield of the intended compound was 91% (17 g, 0.061 mols).

Production of 2-(1-bromoethyl)-5-phenylindene

LiAlH$_4$ (2.0 g, 0.053 mols) and THF (50 ml) were put into a 300-ml eggplant-type flask equipped with a dropping funnel, in a nitrogen atmosphere. Next, a THF solution (50 ml) of ethyl 1-(5-phenyl-2-indenyl)acetate (17 g, 0.061 mols) was gradually and dropwise added thereto in such a manner that the resulting mixture could berefluxed spontaneously. This was then stirred at room temperature for 30 minutes, and 100 ml of diluted hydrochloric acid was added thereto. Then, this was extracted with diethyl ether (300 ml) to obtain a crude product of 2-(1-hydroxyethyl)-5-phenylindene. Its yield was 69% (10 g, 0.042 mols). The resulting crude 2-(1-hydroxyethyl)-5-phenylindene was put into a 300-ml eggplant-type flask along with triphenylphosphine (11.1 g, 0.042 mols) and dewatered methylene chloride (200 ml). With stirring it, N-bromosuccinimide (7.5 g, 0.042 mols) was gradually added thereto. Then, this was stirred for 1 hour at room temperature, and the solvent was evaporated away under reduced pressure. The resulting residue was purified through a column (hexane/methylene chloride=5/1). The yield of the intended compound was 64% (8.1 g, 0.027 mols).

Production of bis(1,2-ethylene)-bis(5-phenylindene)

2-(1-Bromoethyl)-phenylindene (8.1 g, 0.027 mols) and THF (200 ml) were put into a 500-ml eggplant-type flask equipped with a dropping funnel, in a nitrogen atmosphere. At −78° C., a THF solution of bis(trimethylsilyl)lithium amide (1.0 M, 27.0 ml, 0.027 mols) was gradually and dropwise added thereto. After the addition, this was stirred at room temperature for 1 hour. Next, the solvent was evaporated away under reduced pressure, and the resulting residue was purified through a column (hexane/methylene chloride=8/1). The yield of the product was 17% (1.0 g, 0.002 mols).

Production of (1,2'-ethylene)-bis(5-phenylindenylhafnium dichloride (1,2'-Ethylene)(1',2-ethylene)-bis(5-phenylindene) (1.0 g, 0.002 mols) and THF (20 ml) were mixed in a Schlenk tube, and a hexane solution of n-butyllithium (1.66 M, 2.8 ml, 0.004 mols) was gradually and dropwise added thereto in a nitrogen atmosphere. This was stirred overnight at room temperature, and the solvent was then evaporated away under reduced pressure. The resulting residue was washed two times with dry hexane (100 ml). Toluene (30 ml) was put into the resulting Li salt, and a toluene solution (30 ml) of hafnium tetrachloride (0.73 g, 0.002 mols) was gradually put thereinto at −78° C. This was stirred overnight at room temperature, and the solvent was taken out through filtration. The resulting filtrate was concentrated to be 20 ml, and hexane (20 ml) was added thereto. The resulting precipitate was taken out through filtration and dried. The yield of the product, (1,2'-ethylene)(1'-2-ethylene)-bis(5-phenylindenyl) hafnium dichloride (1) was 4.3% (68.4 mg, 100 mmols). The $^1$H-NMR data of the product are as follows:

$^1$H-NMR (δ ppm): 7.60–7.15 (m, 16H), 6.41 (s, 2H), 3.68 (bs, 8H).

EXAMPLE 1

Vapor-phase Polymerization of Propylene:
(1) Preparation of MAO/SiO$_2$ carrier:

Toluene (500 ml) was fed into a 500-ml glass container equipped with a dropping funnel (the container was previously well purged with nitrogen), and Fuji Silicial's silica (4.04 g—this was baked at 200° C. for 3 hours in a nitrogen atmosphere), and stirred at 400 rpm. At 0° C., Albemal's MAO (methylaluminoxane)/toluene solution (29.8 ml) was gradually added thereto over a period of 45 minutes. This was stirred at 0° C. for 1 hour, at room temperature for 1 hour, and then at 80° C. for 4 hours. After having been thus reacted, this was left cooled. At 60° C., the supernatant was washed away through decantation, three times with toluene (200 ml) and three times with heptane (200 ml), and the intended product was obtained. Finally, this was formed into a slurry in heptane, and stored in a Schlenk tube. The amount of aluminium held on the carrier was determined through UV quantification. Al held on the carrier was 12.06%.

Heptane (5 ml) and triisobutylaluminium (2 M, 0.25 ml, 0.5 mmols) were put into a 50-ml Schlenk tube (this was previously well purged with nitrogen) in a nitrogen atmosphere, and then the heptane slurry of MAO/Sio$_2$ carrier obtained in Example 1 (in terms of Al, 0.37 mols/liter, 6.8 ml, 2.5 mmols) and s heptane slurry of (1,2'-ethylene)(1',2-ethylene)-bis(5-phenylindenyl)hafnium dichloride prepared in Production Example 1 (10 µmols/ml, 0.5 ml, 5 µmols) were added thereto, and stirred at room temperature for 30 minutes to prepare a catalyst.

(2) Vapor-phase Polymerization of Propylene:

A catalyst dispersant, polypropylene powder (homo-PP, at least 720 µm, 100 g) was put into a 5-liter autoclave, and dried in vacuum at 70° C. for 20 minutes. The pressure in the autoclave was restored with nitrogen. With the powder in the autoclave being stirred in the nitrogen atmosphere at 200 rpm, triisobutylaluminium (2 M, 1.23 ml, 2.5 mmols)was added thereto. This was further stirred for 15 minutes, and the MAO/SiO$_2$-held catalyst that had been prepared previously was added thereto, and stirred for 5 minutes. At this stage (50° C., normal pressure, 200 rpm), propylene was introduced into the autoclave, which was then further heated and stirred at 350 rpm over a period of 30 minutes, and at last, the reactor temperature reached 70° C. and the propylene pressure reached 2.8 MPa·G. In that condition, the monomer was polymerized for 60 minutes in a mode of vapor-phase polymerization. As a result, the powdery polymer thus formed did not adhere to the wall of the reactor. The polymer was evaluated with respect to the "resin characteristics" mentioned above. Additives mentioned below were added to the polymer, and the resulting polymer composition was pelletized through a short-screw extruder (Tukada Jushi Seisakushol's TLC35–20 Model). The resulting pellets were evaluated according to the above-mentioned "method for evaluating physical properties". The data obtained are given in Table 2.

<Antioxidants>
Ciba Speciality Chemicals' Irganox 1010 (1,000 ppm), and Ciba Speciality Chemicals' Irgafos 168 (1,000 ppm).

PRODUCTION EXAMPLE 2

Production of 1,2-ethanediyl(2-indenyl)(1-(2-isopropylindenyl))hafnium dichloride THF (20 ml) and 2-isopropylindenyllithium (1.69 g, 9,9 mmols) were put into a 100-ml three-neck flask in a nitrogen atmosphere, and cooled to –78° C. Hexamethylphosphoramide (1.74 ml, 10 mnmols) was added thereto. Next, a mixed solution of THF (20 ml) and 1-bromo-2-(2-indenyl)ethane (2 g, 8.96 mmols) was dropwise added thereto, via a dropping funnel. Then, this was stirred at room temperature for 8 hours, and water (5 ml) was added thereto. Ether (100 ml) was added to this, and the organic phase was washed three times with an aqueous copper sulfate solution (50 ml) by the use of a separating funnel. The organic phase was separated, and the solvent was evaporated away from it. The resulting residue was purified through a column (solvent: hexane), and 1-(2-indenyl)-2-(1-(2-isopropylindenyl)) ethane (2 g) was obtained.

Next, diethyl ether (20 ml) and 1-(2-indenyl)-2-(1-(2-isopropylindenyl))ethane (2 g) were put into a 200-ml Schlenk tube in a nitrogen atmosphere, and cooled to –78° C. To this was added a hexane solution of n-butyllithium (1.61 M, 10 ml, 16.1 mmols), and stirred at room temperature for 8 hours. Next, the solvent was evaporated away, and the resulting residue was washed with hexane to obtain a lithium slat of 1-(2-indenyl)-2-(1-(2-isopropylindenyl)) ethane (2.14 g).

Toluene (10 ml) was added to the thus-obtained lithium salt (1.15 g, 3.18 mmols), and cooled to –78° C. A slurry of hafnium chloride (1.02 g, 3.18 mmols) in toluene (10 ml) that had been previously cooled to –78° C. was added to the lithium salt of 1-(2-indenyl)-2-(1-(2-isopropylindenyl)) ethane, via a cannula. This was stirred at room temperature for 8 hours, and the supernatant was separated through filtration. The resulting filtrate was concentrated, and recrystallized from a mixed solvent of methylene chloride/hexane to obtain 1,2-ethanediyl(2-indenyl)(1-(2-isopropylindenyl)) hafnium dichloride (0.45 g, 0.83 mmols). Its $^1$H-NMR data areas follows:

$^1$H-NMR (δ ppm): 7.8–7.0 (m, 8H), 6.50 (s, 1H), 6.11 (d, 1H), 5.92 (d, 1H), 3.65 (m, 4H), 3.30 (m, 1H), 1.50 (d, 3H), 1.25 (d, 3H).

EXAMPLE 2

Slurry Polymerization of Propylene

A one-liter stainless pressure autoclave equipped with a stirrer was heated at 80° C., and well dried under reduced pressure. Its inner pressure was restored to atmospheric pressure with dry nitrogen, and the autoclave was then cooled to room temperature. In the dry nitrogen atmosphere, deoxygenated dry heptane (400 ml) and a heptane solution of triisobutylaluminium (2.0 M, 0.5 ml, 1.0 mmol) were put into the autoclave, and stirred for a while at 350 rpm. On the other hand, toluene (10 ml) and a heptane solution of triisobutylaluminium (2 M, 0.5 ml, 1.0 mmol) were put into a 50-ml Schlenk tube (this was previously well purged with nitrogen) in a nitrogen atmosphere, and a toluene solution of MAO (2.0 M, 1.0 ml, 2.0 mmols) and a heptane slurry of 1,2-ethanediyl(2-indenyl)(1-(2-isopropylindenyl))hafnium dichloride prepared in Production Example 2 (10 µmols/liter, 0.2 ml, 2.0 µmols) were added thereto, and stirred at room temperature for 3 minutes. The thus-prepared catalyst slurry was immediately put into the autoclave. With that, the contents of the autoclave were stirred at 1,200 rpm. Next, propylene was introduced into the autoclave and was gradually heated up to 50° C., with its pressure being gradually increased up to 0.8 MPa·G. In that condition, the monomer was polymerized for 60 minutes. After the reaction, the non-reacted propylene was removed by degassing the autoclave. The reaction mixture was poured into 2 liters of methanol, in which the product, polypropylene precipitated.

This was taken out through filtration and dried. The product, polypropylene was analyzed and evaluated in the same manner as in Example 1. Its data are given in Table 2.

COMPARATIVE EXAMPLE 1

(1) Preparation of Magnesium Compound

A glass container having a capacity of about liters and equipped with a stirrer was fully purged with nitrogen gas, and ethanol (about 2430 g), iodine (16 g) and metal magnesium (160 g) were fed into it. With stirring, these were heated and reacted under reflux until they gave no hydrogen gas. Thus was formed a solid reaction product. The reaction mixture containing the solid reaction product was dried under reduced pressure, and a magnesium compound was obtained.

(2) Preparation of Solid Catalyst Component (A):

The magnesium compound prepared in the previous step (not ground, 160 g), pure heptane (800 ml), silicon tetrachloride (24 ml) and diethyl phthalate (23 ml) were fed into a 5-liter glass reactor that had been previously well purged with nitrogen gas. With the system being kept at 80° C., titanium tetrachloride (770 ml) was added thereto with stirring, and reacted at 110° C. for 2 hours. Then, the solid component was separated, and washed with pure heptane at 90° C. Titanium tetrachloride (1220 ml) was added thereto, and reacted at 110° C. for 2 hours, and the resulting product was well washed with pure heptane. Thus was obtained a solid catalyst component (A).

(3) Vapor-phase Polymerization:

To a 200-liter polymerization reactor, fed were the solid catalyst component prepared in the previous step (2) (6.0 g/hr), triisobutylaluminium (TIBA) (0.2 mols/hr), 1-allyl-3,4-dimethoxybenzene (ADMB) (0.012 mols/hr), cyclohexylmethyldimethoxysilane (CHMDMS) (0.010 mols/hr) and propylene (37 kg/hr), and the monomer was polymerized at 70° C. The monomer pressure was 20.8 MPa·G. The polypropylene powder thus obtained was evaluated according to the method for "evaluation of resin characteristics" in the same manner as in Example 1. On the other hand, the polypropylene powder was mixed with 2,5-dimethyl-2,5-di(t-butylperoxy)hexane, to which were added an antioxidant, a stabilizer and a chlorine-trapping agent. The resulting polymer composition was pelletized through a 40 mmø extruder. The pellets were evaluated according to the "method for evaluating physical properties" in the same manner as in Example 1. The data of the polymer are given in Table 1. The test pieces formed by press-molding the polymer were sticky.

COMPARATIVE EXAMPLE 2

The same process as in Comparative Example 1 was repeated, except that the amount of cyclohexylmethyldimethoxysilane (CHMDMS) used herein was 0.025 mols/hr and not 0.010 mols/hr. The data of the polymer obtained herein are given in Table 2. The test pieces formed bypress-molding the polymer were sticky.

COMPARATIVE EXAMPLE 3

Ethylenebis(indenyl)hafnium dichloride prepared in accordance with Example 1 of Japanese Patent No. 2,685,262 was used herein for slurry polymerization of propylene in the manner mentioned below.

A one-liter stainless pressure autoclave equipped with a stirrer was heated at 80° C., and well dried under reduced pressure. Its pressure was restored to atmospheric pressure with dry nitrogen, and the autoclave was cooled to room temperature. In the dry nitrogen atmosphere, deoxygenated dry toluene (400 ml) and a heptane solution of triisobutylaluminium (2.0M, 0.5 ml, 1.0 mmol) were put into the autoclave, and stirred for a while at 350 rpm. Next, a toluene solution of MAO (2.03 M, 0.13 ml, 0.26 mmols) and a heptane slurry of ethylenebis(indenyl)hafniumdichloride (5 µmols/liter, 0.38 ml, 1.9 µmols) were immediately put into the autoclave. With that, the contents of the autoclave were-stirred at 1,200 rpm. Next, propylene was introduced into the autoclave and was gradually heated up to 50° C., with its pressure being gradually increased up to 0.7 MPa·G over a period of 3 minutes. In that condition, the monomer was polymerized for 60 minutes. After the reaction, methanol (20 ml) was put into the autoclave, and the non-reacted propylene was removed by degassing the autoclave. The reaction mixture was poured into 4 liters of methanol, in which the product, polypropylene precipitated. This was taken out through filtration and dried. The product, polypropylene was analyzed and evaluated in the same manner as in Example 1. Its data are given in Table 2. The test pieces formed by press-molding the polymer were not transparent.

COMPARATIVE EXAMPLE 4

Slurry Polymerization of Propylene with 1-butene:

A one-liter stainless pressure autoclave equipped with a stirrer was heated at 80° C., and well dried under reduced pressure. Its pressure was restored to atmospheric pressure with dry nitrogen, and the autoclave was cooled to room temperature. In the dry nitrogen atmosphere, deoxygenated dry toluene (400 ml), 1-butene (30 ml), and a heptane solution of triisobutylaluminium (2.0 M, 0.5 ml, 1.0 mmol) were put into the autoclave, and stirred for a while at 350 rpm. Next, a toluene solution of MAO (2.03 M, 0.13 ml, 0.26 mmols) and a heptane slurry of ethylenebis(indenyl) hafnium dichloride (5 µmols/liter, 0.57 ml, 2.9 µmols) were immediately put into the autoclave. With that, the contents of the autoclave were stirred at 1,200 rpm. Next, propylene was introduced into the autoclave and was gradually heated up to 50° C., with its pressure being gradually increased up to 0.7 MPa·G over a period of 3 minutes. In that condition, the monomers were polymerized for 60 minutes. After the reaction, methanol (20 ml) was put into the autoclave, and the non-reacted propylene was removed by degassing the autoclave. The reaction mixture was poured into 4 liters of methanol, in which the product, copolymer precipitated. This was taken out through filtration and dried. The product, polypropylene/1-butene copolymer was analyzed and evaluated in the same manner as in Example 1. Its data are given in Table 2. The test pieces formed by press-molding the copolymer were sticky.

COMPARATIVE EXAMPLE 5

A one-liter stainless pressure autoclave equipped with a stirrer was heated at 80° C., and well dried under reduced pressure. Its inner pressure was restored to atmospheric pressure with dry nitrogen, and the autoclave was then cooled to room temperature. In the dry nitrogen atmosphere, deoxygenated dry heptane (400 ml) and a heptane solution of triisobutylaluminium (2.0 M, 0.5 ml, 1.0 mmol) were put into the autoclave, and stirred for a while at 350 rpm. On the other hand, toluene (10 ml) and a heptane solution of triisobutylaluminium (2 M, 0.5 ml, 1.0 mmol) were put into a 50-ml Schlenk tube (this was previously well purged with nitrogen) in a nitrogen atmosphere, and a toluene solution of MAO (2.0 M, 1.0 ml, 2.0 mmols) and a heptane slurry of ethylenebisindenyl zirconium dichloride (10 µmols/liter, 0.2 ml, 2.0 μmols) were added thereto, and stirred at room temperature for 3 minutes. The thus-prepared catalyst slurry was immediately put into the autoclave. With that, the contents of the autoclave were stirred at 1,200 rpm. Next, propylene was introduced into the autoclave and was gradually heated up to 80° C., with its pressure being gradually increased up to 0.7 MPa·G. In that condition, the monomer was polymerized for 60 minutes. After the reaction, the non-reacted propylene was removed by degassing the autoclave. The reaction mixture was poured into 2 liters of methanol, in which the product, polypropylene precipitated. This was taken out through filtration and dried. The product, polypropylene was analyzed and evaluated in the same manner as in Example 1. Its data are given in Table 2. The test pieces formed by press-molding the polymer had poor mechanical strength.

EXAMPLE 3

Production of dimethylsilylene(2-indenyl)(1-(2-methyl-4,5-benzoindenyl))hafnium dichloride Production of 2-methyl-4,5-benzo-1-indanone Methylene chloride (100 ml), naphthalene (5 g, 0.039 mols) and 2-bromoisobutyryl bromide (9 g, 0.039 mols) were put into a 300-ml three-neck flask equipped with a nitrogen inlet duct. In a nitrogen atmosphere, aluminium chloride (6 g, 0.047 mols) was gradually put thereinto. After 1 hour, the reaction mixture was poured into cold water (200 ml), and the organic phase was separated via a separating funnel. The organic phase was dried with magnesium sulfate, and taken out through filtration. The solvent was evaporated away to obtain the intended compound (6.4 g). Its yield was 84%.

Production of 2-methyl-4,5-benzoindene

2-Methyl-4,5-benzo-1-indanone (6.4 g) was dissolved in methanol (100 ml). To the resulting solution, sodium borohydride (1 g, 0.026 mols) was gradually added. After 30 minutes, this was extracted with water (100 ml) and ether (100 ml) added thereto. The organic phase was separated via a separating funnel. The organic phase was dried with magnesium sulfate and taken out through filtration. The solvent was evaporated away to obtain 2-methyl-4,5-benzoindanol (5.7 g). The thus-obtained 2-methyl-4,5-benzoindanol (5.7 g) was dissolved in toluene (100 ml), to which was added pyridinium p-toluenesulfonate (0.5 g). In a Dean-Stark device, this was refluxed for 30 minutes for dehydration. After the reaction, the solvent was evaporated away under reduced pressure, and the resulting residue was purified through a column (solvent: hexane) to obtain the intended compound (3 g). Its yield was 48%.

Production of 2-indenyl-dimethylchlorosilane

Magnesium powder (1.3 g), iodine (0.01 g) and dewatered THF (20 ml) were put into a 200-ml three-neck flask equipped with a Dimroth condenser and a dropping funnel. 2-Bromoindene (this was produced according to a reference, J. Org. Chem. 47, (4), 705, 1982) (5.4 g, 27.2 mmols) and dewatered THF (40 ml) were put into the dropping funnel, via which these were gradually and dropwise introduced into the flask in a nitrogen atmosphere so that the contents of the flask could be lightly refluxed. After the addition, this was stirred at room temperature for 30 minutes. Next, dichlorodimethylsilane (3.1 g, 28.5 mmol) and dewatered THF (20 ml) were put into the dropping funnel, via which the resulting solution was dropwise introduced into the flask at −78° C. After the addition, this was stirred for 8 hours at room temperature. The solvent was evaporated away under reduced pressure, and the residue was extracted with dewatered hexane (100 ml). After the solvent was thus removed, obtained was the intended compound (5.3 g). Its yield was 91%.

Production of (2-indenyl)(1-(2-methyl-4,5-benzoindenyl))dimethylsilane

2-Methyl-4,5-benzoindene (1.26 g, 7 mmols) and dewatered hexane (50 ml) were put into a 200-ml Schlenk tube that had been purged with nitrogen. To the resulting solution, dropwise added was a hexane solution of n-butyllithium (1.50 M, 4.7 ml, 7 cmols) at −78° C. After the addition, this was stirred at room temperature for 8 hours, and this gave a precipitate of 2-methyl-4,5-benzoindenyllithium. The resulting suspension was kept static, and the supernatant was removed through decantation. Dewatered THF (25 ml) was added thereto and cooled to −78° C. A dewatered THF solution (25 ml) of 2-indenyl-dimethylchlorosilane (1.46 g, 7 mmols) that had been prepared previously was dropwise added to it. After the addition, this was stirred at room temperature for 4 hours. After having been thus reacted, water (50 ml) was added thereto, and this was extracted with ether (200 ml). The extract was taken out via a separating funnel, and the thus-obtained organic phase was dried with magnesium sulfate and filtered. The solvent was evaporated away to obtain the intended compound (2.2 g). Its yield was 89%.

Production of dimethylsilylene(2-indenyl)(1-(2-methyl-4,5-benzoindenyl))hafnium dichloride (2-Indenyl)(1-(2-methyl-4,5-benzoindenyl))dimethylsilane (1.0 g, 2.8 mmols) prepared previously and dewatered hexane (40 ml) were put into a 200-ml Schlenk tube that had been purged with nitrogen. To the resulting solution, dropwise added was a hexane solution of n-butyllithium (1.50 M, 3.7 ml, 5.6 mmols) at −78° C. After the addition, this was stirred at room temperature for 8 hours, and this gave a precipitate of (2-indenyl)(1-(2-methyl-4,5-benzoindenyl))dimethylsilanedilithium. The resulting suspension was kept static, and the supernatant was removed through decantation. Dewatered toluene (25 ml) was added thereto and cooled to −78° C., to which was dropwise added a suspension of hafnium tetrachloride (0.9 g, 2.8 mmol) in dewatered toluene (25 ml). After the addition, this was stirred at room temperature for 6 hours. After the reaction, this was filtered through a cannula, and the filtrate was concentrated. With that, dewatered hexane was added thereto. The resulting precipitate was taken out through filtration and dried to obtain the intended compound (0.2 g). Its yield was 12%.

$^1$H-NMR (δ ppm/CDCl$_3$): 8.0–7.0 (m, 8H), 6.50 (s, 1H), 6.08 (d, 1H), 5.93 (d, 1H), 2.45 (s, 3H), 1.12 (s, 3H), 0.99 (s, 3H).

Slurry Polymerization of Propylene

A one-liter stainless pressure autoclave equipped with a stirrer was heated at 80° C., and well dried under reduced pressure. Its inner pressure was restored to atmospheric pressure with dry nitrogen, and the autoclave was then cooled to room temperature. In the dry nitrogen atmosphere, deoxygenated dry heptane (400 ml) and a heptane solution of triisobutylaluminium (2.0 M, 0.5 ml, 1.0 mmol) were put into the autoclave, and stirred for a while at 350 rpm. Next, a toluene solution of MAO (2.03 M, 0.13 ml, 0.26 mmols) and a heptane slurry of dimethylsilylene(2-indenyl)(1-(2-methyl-4,5-benzoindenyl))hafnium dichloride (10 μmols/liter, 0.1 ml, 1.0 pmol) that had been prepared in the previous step were immediately put into the autoclave.

With that, the contents of the autoclave were stirred at 1,200 rpm. Next, hydrogen was introduced into the autoclave to have a pressure of 0.01 MPa, and then propylene was introduced thereinto and was gradually heated up to 40° C., with its pressure being gradually increased up to 0.7 MPa over a period of 3 minutes. In that condition, the monomer was polymerized for 60 minutes. After the reaction, methanol (20 ml) was put into the autoclave, and the non-reacted propylene was removed by degassing the autoclave. The reaction mixture was poured into 2 liters of methanol, in which the product, polypropylene precipitated. This was taken out through filtration and dried. The product, polypropylene was analyzed and evaluated for its resin characteristics and physical properties in the same manner as in Example 1. Its data are given in Table 3.

EXAMPLE 4

Bulk Polymerization of Propylene

A one-liter stainless pressure autoclave equipped with a stirrer was heated at 80° C., and well dried under reduced pressure. Propylene (500 ml) was introduced into it, and a heptane solution of triisobutylaluminium (2.0 M, 0.5 ml, 1.0 mmols) was put thereinto via a catalyst inlet duct, and stirred for a while at 200 rpm. Next, a mixture of heptane (5 ml) and a toluene solution of MAO (2.03 M, 0.13 ml, 0.26 mmols) and then a mixture of a heptane slurry of dimethylsilylene (2-indenyl)(1-(2-methyl-4,5-benzoindenyl))hafnium dichloride (10 μmols/liter, 0.1 ml, 1.0 μmol) that had been prepared previously and heptane (5 ml) were immediately put into the autoclave in that order.

With that, the contents of the autoclave were stirred at 400 rpm, and heated up to 40° C. In that condition, the monomer was polymerized for 30 minutes. After the reaction, methanol (20 ml) was put into the autoclave, and the non-reacted propylene was removed by degassing the autoclave. The resulting residue was dried to obtain polypropylene. The product, polypropylene was analyzed and evaluated for its resin characteristics and physical properties in the same manner as in Example 1. Its data are given in Table 3.

EXAMPLE 5

Production of Dimethylsilylene(2-indenyl)(1-(2-methyl-4,5-benzoindenyl))zirconium dichloride (2-Indenyl)(1-(2-methyl-4,5-benzoindenyl))dimethylsilane (1.0 g, 2.8 mmols) prepared previously and dewatered hexane (40 ml) were put into a 200-ml Schlenk tube that had been purged with nitrogen. To the resulting solution, dropwise added was a hexane solution of n-butyllithium (1.50 M, 3.7 ml, 5.6 mmols) at −78° C. After the addition, this was stirred at room temperature for 8 hours, and this gave a precipitate of (2-indenyl)(1-(2-methyl-4,5-benzoindenyl))dimethylsilanedilithium. The resulting suspension was kept static, and the supernatant was removed through decantation. Dewatered toluene (25 ml) was added thereto and cooled to −78° C., to which was dropwise added a suspension of zirconium tetrachloride (0.9 g, 2.8 mmol) in dewatered toluene (25 ml). After the addition, this was stirred at room temperature for 6 hours. After the reaction, this was filtered through a cannula, and the filtrate was concentrated. With that, dewatered hexane was added thereto. The resulting precipitate was taken out through filtration and dried to obtain the intended compound (0.2 g). Its yield was 12%.

$^1$H-NMR (6 ppm/CDCl$_3$): 8.0–7.0 (m, 8H), 6.50 (s, 1H), 6.12 (d, 1H), 6.02 (d, 1H), 2.32 (s, 3H), 1.10 (s, 3H), 0.95 (s, 3H).

[Slurry polymerization of propylene]

A one-liter stainless pressure autoclave equipped with a stirrer was heated at 80° C., and well dried under reduced pressure. Its inner pressure was restored to atmospheric pressure with dry nitrogen, and the autoclave was then cooled to room temperature. In the dry nitrogen atmosphere, deoxygenated dry heptane (400 ml) and a heptane solution of triisobutylaluminium (2.0 M, 0.5 ml, 1.0 mmol) were put into the autoclave, and stirred for a while at 350 rpm. Next, a toluene solution of methylaluminoxane (MAO) (2.03 M, 0.13 ml, 0.26 mmols) and a heptane slurry of dimethylsilylene(2-indenyl) (1-(2-methyl-4,5-benzoindenyl))zirconium dichloride (10 μmols/liter, 0.1 ml, 1.0 μmol) that had been prepared in the previous step were immediately put into the autoclave.

With that, the contents of the autoclave were stirred at 1,200 rpm. Next, propylene was introduced into the autoclave and was gradually heated up to 50° C., with its pressure being gradually increased up to 0.7 MPa over a period of 3 minutes. In that condition, the monomer was polymerized for 60 minutes. After the reaction, methanol (20 ml) was put into the autoclave, and the non-reacted propylene was removed by degassing the autoclave. The reaction mixture was poured into 2 liters of methanol, in which the product, polypropylene precipitated. This was taken out through filtration and dried. The product, polypropylene was analyzed and evaluated for its resin characteristics and physical properties in the same manner as in Example 1. Its data are given in Table 3.

TABLE 2

| | Item | Example 1 | Example 2 | Comp. Ex. 1 | Comp. Ex. 2 | Comp. Ex. 3 | Comp. Ex. 4 | Comp. Ex. 5 |
|---|---|---|---|---|---|---|---|---|
| Resin | [η] (dl/g) | 1.0 | 1.7 | 1.8 | 1.9 | 2.7 | 1.5 | 0.24 |
| Character- | [mmmm] (mol %) | 79.0 | 78.0 | 60.3 | 72.2 | 82.9 | — | 79.5 |
| istics | [mm] (mol %) | — | — | — | — | — | 90.2 | — |
| | 2,1-ins (mol %) | 0 | 0 | 0 | 0 | 0.6 | — | 0.7 |
| | 1,3-ins (mol %) | 0.8 | 0.3 | 0 | 0 | 0.1 | — | 0.1 |
| | Mw/Mn | 2.1 | 2.2 | 2.4 | 2.6 | 2.3 | 2.4 | 2.2 |
| | Tm (° C.) | 132 | 130 | 158 | 160 | 132 | 126 | 129 |
| | Comonomer content (mol %) | — | — | — | — | — | 2.0 | — |
| | Boiling diethyl ether extract (wt. %) | 0.2 | 0.2 | 34 | 12 | 0.2 | 0.5 | 0.3 |
| | Tp (° C.) | 85 | 86 | 115 | 116 | 91 | 83 | 81 |
| | Eluate within Tp ± 5° C. (wt. %) | 89 | 91 | 33 | 68 | 94 | 88 | 87 |
| | Th (° C.) | 3.6 | 3.4 | 9.2 | 7.7 | 4.1 | 3.8 | 3.8 |
| | ΔH (J/g) | 94 | 92 | 54 | 79 | 80.5 | 78.0 | 63.5 |
| | 0.45 × Tm + 22 | 81.4 | 80.5 | 93.1 | 94.0 | 81.4 | 78.7 | 80.1 |
| Physical | Tensile modulus (Mpa) | 1150 | 1200 | 440 | 514 | 1060 | 1040 | broken |
| Properties | Internal haze (%) | 42.5 | 43.7 | 44.9 | 15.8 | 52.0 | 38.0 | broken |

TABLE 3

| | Item | Example 3 | Example 4 | Example 5 |
|---|---|---|---|---|
| Resin Characteristics | [η] (dl/g) | 1.9 | 2.2 | 1.7 |
| | [mmmm] (mol %) | 72.4 | 73.5 | 70.9 |
| | 2,1-ins (mol %) | 0.2 | 0.1 | 0.2 |
| | 1,3-ins (mol %) | 0 | 0 | 0 |
| | Mw/Mn | 2.2 | 2.1 | 2.1 |
| | Tm (° C.) | 120.5 | 121.4 | 118.4 |
| | Comonomer content (mol %) | — | — | — |
| | Boiling diethyl ether extract (wt. %) | 0.2 | 0.3 | 0.3 |
| | Tp (° C.) | 75.6 | 76.2 | 74.2 |
| | Eluate within Tp ± 5° C. (wt. %) | 89 | 91 | 89 |
| | Th (° C.) | 3.4 | 3.5 | 3.5 |
| | ΔH (J/g) | 77.2 | 78.1 | 76.7 |
| | 0.45 × Tm + 22 | 76.2 | 76.6 | 75.3 |
| Physical Properties | Tensile modulus (Mpa) | 480 | 490 | 460 |
| | Internal haze (%) | 40.5 | 42.0 | 38.0 |

INDUSTRIAL APPICABILITY

The olefin polymer of the invention is not sticky, and is transparent and flexible (its tensile modulus is low). In addition, its melting point is well balanced with its tensile modulus. Therefore, the polymer is well molded and worked even at low temperatures (for example, its low-temperature heat-sealability is good), and can be formed into good moldings having good secondary workability for embossing and heat-sealing, for example, into stretched films and blow moldings. The polymer is favorable to laminate films, heat sealants, stretched films, soft resin modifiers, and blow moldings.

What is claimed is:

1. A propylene polymer which satisfies the following requirements (1) to (4):
   (1) ΔH≧0.45 Tm+22, wherein ΔH is a heat of fusion (J/g) and Tm is a melting point (° C.) measured through differential scanning calorimetry;
   (2) 110 ≦Tm≦140, wherein Tm is the melting point;
   (3) Th≦5, wherein Th is a half-value width (° C.) of the peak top of its elution curve, the elution curve being obtained in programmed temperature fractionation where a sample solution in o-dichlorobenzene is fractionated by raising the temperature from 0° C. to 135° C. at a heating rate of 40° C./hr; and
   (4) an intrinsic viscosity [η] of 0.5 to 5 dl/g when measured in a solvent of tetralin at 135° C.

2. The propylene polymer as claimed in claim 1, which is a propylene homopolymer having an isotactic pentad fraction (mmmm) of from 65 to 85 mol %.

3. The propylene polymer as claimed in claim 1, which is a propylene homopolymer having an isotactic pentad fraction (mmmm) of from 70 to 80 mol %.

4. A molding obtained by molding the propylene polymer of claim 1.

5. A method for producing the propylene polymer of claim 1, which comprises polymerizing propylene or propylene with ethylene and/or an α-olefin having from 4 to 20 carbon atoms, in the presence of an olefin polymerization catalyst that contains (A) a transition metal compound of the Group 4 of the Periodic Table represented by the following general formula (1), and (B) at least one compound selected from the group consisting of (B-1) aluminiumoxy compounds and (B-2) ionic compounds, the ionic compounds being capable of reacting with the transition metal compound to give cations:

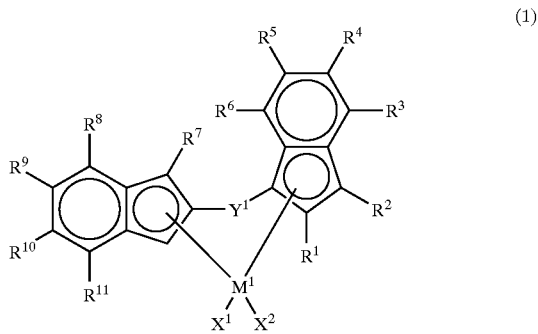

(1)

wherein $R^8$ and $R^{11}$ are each hydrogen, $R^1$ to $R^7$, $R^9$ to $R^{10}$, and $X^1$ and $X^2$ each independently represent a hydrogen atom, a halogen atom, a hydrocarbon group having from 1 to 20 carbon atoms, a halogen-containing hydrocarbon group having from 1 to 20 carbon atoms, a silicon-containing group, an oxygen-containing group, a sulfur-containing group, a nitrogen-containing group, or a phosphorus-containing group; $R^3$ and $R^4$, and $R^8$ and $R^9$ may be bonded to each other to form a ring; $Y^1$ is a is a divalent bridging group that bridges the two ligands, representing any of a hydrocarbon group having from 1 to 20 carbon atoms, a halogen-containing hydrocarbon group having from 1 to 20 carbon atoms, a silicon-containing group, a germanium-containing group, a tin-containing group, —O—, —CO—, —S—, —SO$_2$—, —NR$^{12}$—, —PR$^{12}$—, —P(O)R$^{12}$—, —BR$^{12}$— or —AlR$^{12}$—; $R^{12}$ represents a hydrogen atom, a halogen atom, a hydrogen group having from 1 to 20 carbon atoms, or a halogen-containing hydrocarbon group having from 1 to 20 carbon atoms; $M^1$ represents titanium, zirconium or hafnium.

6. The method for producing the propylene polymer as claimed in claim 5, wherein propylene or propylene with ethylene and/or an α-olefin having from 4 to 20 carbon atoms is polymerized in a vapor phase.

7. The method for producing the propylene polymer as claimed in claim 5, wherein propylene or propylene with ethylene and/or an α-olefin having from 4 to 20 carbon atoms is polymerized in the presence of liquid propylene.

* * * * *